(12) United States Patent
Krzymien et al.

(10) Patent No.: US 10,903,951 B2
(45) Date of Patent: Jan. 26, 2021

(54) SYSTEMS AND METHODS FOR ADAPTIVE PILOT ALLOCATION

(71) Applicant: Futurewei Technologies, Inc., Plano, TX (US)

(72) Inventors: Lukasz Krzymien, Rolling Meadows, IL (US); Philippe Sartori, Plainfield, IL (US); Weimin Xiao, Hoffman Estates, IL (US); Qian Cheng, Aurora, IL (US); Carmela Cozzo, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 162 days.

(21) Appl. No.: 15/168,780

(22) Filed: May 31, 2016

(65) Prior Publication Data

US 2016/0359600 A1 Dec. 8, 2016

Related U.S. Application Data

(60) Provisional application No. 62/171,684, filed on Jun. 5, 2015.

(51) Int. Cl.
*H04L 5/00* (2006.01)
*H04L 1/06* (2006.01)
(Continued)

(52) U.S. Cl.
CPC .......... *H04L 5/0048* (2013.01); *H04L 1/0023* (2013.01); *H04L 1/0693* (2013.01);
(Continued)

(58) Field of Classification Search
CPC ....... H04L 1/16; H04L 1/0023; H04L 1/0693; H04L 5/0048; H04L 27/2601;
(Continued)

(56) References Cited

U.S. PATENT DOCUMENTS 9,154,273 B2 * 10/2015 Moon et al.
2009/0109914 A1 * 4/2009 McBeath et al.
(Continued)

FOREIGN PATENT DOCUMENTS

| CN | 1859433 A | 11/2006 |
|---|---|---|
| CN | 1866969 A | 11/2006 |

(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 12)," 3GPP TS 36.211 V12.5.0, Mar. 2015, 136 pages.

(Continued)

*Primary Examiner* — Marsha D Banks Harold
*Assistant Examiner* — Dharmesh J Patel
(74) *Attorney, Agent, or Firm* — Slater Matsil, LLP

(57) ABSTRACT

System and method embodiments are provided for adaptive pilot allocation. In an embodiment, a method in a communication controller for adaptive pilot allocation includes determining at least one channel condition parameter for a wireless channel between the communications controller and a user equipment (UE). The method includes selecting a microframe pilot pattern to use for subsequent communications on the wireless channel according to the at least one channel condition parameter. Additionally, the method includes signaling an indication of the selected microframe pilot pattern to the user equipment. The method further includes transmitting data to the UE using the selected microframe pilot pattern.

22 Claims, 14 Drawing Sheets

(51) Int. Cl.
  *H04L 1/00* (2006.01)
  *H04L 1/16* (2006.01)
  *H04W 48/12* (2009.01)
  *H04L 1/18* (2006.01)

(52) U.S. Cl.
  CPC .............. *H04L 1/16* (2013.01); *H04L 5/0091* (2013.01); *H04L 1/1854* (2013.01); *H04L 1/1887* (2013.01); *H04L 5/006* (2013.01); *H04W 48/12* (2013.01)

(58) Field of Classification Search
  CPC ... H04W 48/12; H04W 52/42; H04W 52/143; H04W 52/241; H04W 52/325; H04W 52/343
  See application file for complete search history.

(56) References Cited

U.S. PATENT DOCUMENTS

| | | |
|---|---|---|
| 2010/0290370 A1 | 11/2010 | Li et al. |
| 2012/0127878 A1 | 5/2012 | Kim et al. |
| 2014/0056374 A1 | 2/2014 | Güransson et al. |
| 2014/0274079 A1* | 9/2014 | Li .................. H04W 72/04 455/450 |
| 2014/0376493 A1* | 12/2014 | Hwang ................ H04L 5/0048 370/329 |
| 2015/0098435 A1* | 4/2015 | Nam .................... H04L 5/0048 370/329 |
| 2015/0131565 A1* | 5/2015 | Nakashima .......... H04L 1/0026 370/329 |
| 2015/0139177 A1 | 5/2015 | Li et al. |
| 2016/0044663 A1* | 2/2016 | Yao et al. |
| 2016/0270116 A1* | 9/2016 | Lin et al. |

FOREIGN PATENT DOCUMENTS

| | | |
|---|---|---|
| CN | 101843009 A | 9/2010 |
| WO | 2014148961 A1 | 9/2014 |

OTHER PUBLICATIONS

Simko, M. et al., "Adaptive Pilot-Symbol Patterns for MIMO OFDM Systems," IEEE Transactions on Wireless Communications, vol. 12, No. 9, Sep. 2013, 11 pages.

"LTE; Evolved Universal Terrestrial Radio Access (E-UTRA); Physical Channels and Modulation (3GPP TS 36.211 Version 12.5.0 Release 12)," ETSI TS 136 211 V12.5.0, Apr. 2015, 139 pages.

* cited by examiner

SYSTEMS AND METHODS FOR ADAPTIVE PILOT ALLOCATION

This application claims priority to U.S. Provisional Application Ser. No. 62/171,684, filed on Jun. 5, 2015 entitled "System and Method for Adaptive Pilot Allocation," which application is hereby incorporated herein by reference.

TECHNICAL FIELD

The present invention relates to a system and method for wireless communications, and, in particular embodiments, to a system and method for adaptive pilot allocation.

BACKGROUND

After the success of Long Term Evolution (LTE), the wireless industry is looking at ways to meet the ever-increasing demand for wireless communication. Several technologies are being investigated, such as the use of massive multiple-input multiple-output (MIMO) or the development of new modulation schemes.

In LTE there are many types of pilots, but they are fixed in time/frequency (T/F) for a given type and antenna port configuration.

The earliest pilots, existing in the very first release of LTE are cell-specific reference signals (C-RS), which are common to all users and are placed in a form of diamond with time and frequency separation of 285 μs and 45 kHz for normal cyclic prefix (CP) length. For extended CP, the time separation is slightly longer. C-RS signals are only specified for 15 kHz subcarrier spacing. C-RS are transmitted from 1, 2 and 4 antenna ports using $p=0$, $p=0,1$ and $p=0, \ldots, 3$.

Other than common reference signals, there are user-specific signals used in LTE. User equipment (UE) specific reference signals are embedded only in the resource blocks (RBs) to which physical downlink shared channel (PDSCH) is mapped for the UEs. A typical application of user-specific RS is to enable beamforming for the data transmissions to specific UEs. UE-specific RS are called demodulation RS (DM-RS). DM-RS on the downlink is used for demodulating both PDSCH (ports $p=5, p=7, p=8, p=7,8, \ldots, v+6$, where v is the number of layers used to transmit PDSCH) and enhanced physical downlink control channel (EPDCCH) channel (ports $p=\{107,108,109,110\}$). These RS signals are half of the density of CRS to minimize overhead, are similarly placed, but do not overlap in T/F with CRS REs.

In Rel-10 another type of UE specific reference signal was introduced: channel state information RS (CSI-RS) since new transmission modes were added, specifically mode 9 (TM9) used in high order MIMO transmissions. CSI-RS is present only in some transmission modes with multiple antennas (mode 9) or supporting coordinated multipoint (CoMP) functionality (mode 10) and occupies typically 2 resource elements (REs) per antenna port (ports 15-22). CSI-RS signals are transmitted from 1, 2, 4 or 8 antenna ports using $p=15$, $p=15,16$, $p=15, \ldots, 18$ and $p=15, \ldots, 22$, respectively. More on reference signals location and generation can be found in 3GPP TS 36.211.

SUMMARY

An embodiment method in a communication controller for adaptive pilot allocation includes determining at least one channel condition parameter for a wireless channel between the communications controller and a user equipment (UE). The method includes selecting a microframe pilot pattern to use for subsequent communications on the wireless channel according to the at least one channel condition parameter. Additionally, the method includes signaling an indication of the selected microframe pilot pattern to the user equipment. The method further includes transmitting data to the UE using the selected microframe pilot pattern.

In an embodiment, determining the at least one channel condition parameter includes transmitting, by the communications controller, a pilot signal to the UE. The determining also includes receiving channel state information (CSI) feedback from the UE. The CSI feedback includes at least one spread parameter calculated by the UE. The determining also includes determining, by the communication controller, the at least one channel condition parameter according to the at least one spread parameter. In an embodiment, the at least one spread parameter includes a maximum number of subcarriers between pilot symbols, a location of a first pilot in frequency, a maximum number of symbols between pilots, and a location of the first pilot in time.

In an embodiment, determining the at least one channel condition parameter includes receiving, by the communications controller, a sounding reference signal (SRS) message from the UE. The determining the at least one channel condition parameter also includes determining, by the communications controller, the at least one channel condition parameter according to the SRS message.

In an embodiment, the microframe pilot pattern is selected from a set of predefined microframe pilot pattern allocations. In an embodiment, selecting the microframe pilot pattern to use for subsequent communications on the wireless channel is performed according to feedback from at least two receivers. In an embodiment, signaling the indication of the selected microframe pilot pattern to the UE comprises signaling pilot parameters in a downlink control information (DCI). In an embodiment, the method also includes signaling a change in the pilot pattern through bit toggling.

An embodiment communications controller includes a processor and a non-transitory computer readable storage medium storing programming for execution by the processor. The programming including instructions for determining at least one channel condition parameter for a wireless channel between the communications controller and a user equipment (UE). The programming also includes instructions for selecting a microframe pilot pattern to use for subsequent communications on the wireless channel according to the at least one channel condition parameter. The programming further includes instructions for signaling an indication of the selected microframe pilot pattern to the UE. Additionally, the programming includes instructions for transmitting data to the UE using the selected microframe pilot pattern.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
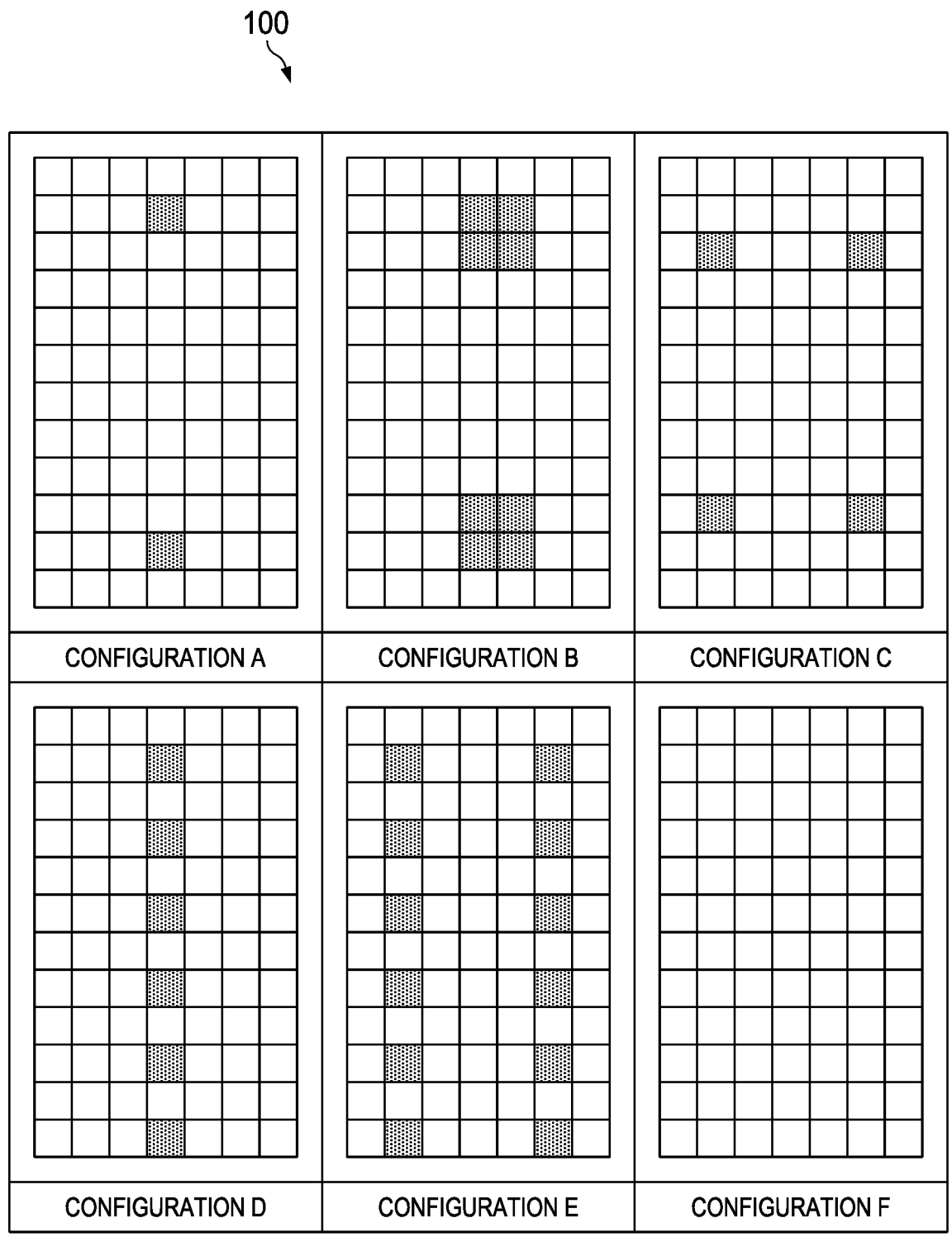
FIG. 1 illustrates an example set of microframe RS patterns.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Embodiment techniques reduce overhead to improve spectrum efficiency, which overhead includes reference signals, control channels, and, generally, any bit that does not carry a user's information. Embodiments reduce the reference signal (RS) overhead. Embodiments are described for sub-6 GHz WB-LTE, but also are applicable to many other scenarios. In particular, embodiments provide improvement of existing LTE. Embodiments also can be used for 5G deployments in the millimeter band, either LTE or non-LTE-based.

An embodiment method for adaptive pilot allocation includes determining channel condition parameters for a wireless channel between a communications controller and a user equipment. The method also includes selecting a microframe pilot pattern to use for subsequent communications on the wireless channel according to the channel condition parameters. Additionally, the method includes signaling an indication of the selected microframe pilot pattern to the user equipment. The method further includes transmitting data from the communication controller to the user equipment using the selected microframe pilot pattern.

An embodiment communications controller includes a processor and a non-transitory computer readable storage medium storing programming for execution by the processor. The programming including instructions for determining channel condition parameters for a wireless channel between the communications controller and a user equipment. The programming also includes instructions for selecting a microframe pilot pattern to use for subsequent communications on the wireless channel according to the channel condition parameters. Additionally, the programming includes instructions for signaling an indication of the selected microframe pilot pattern to the user equipment. The programming further includes instructions for transmitting data to the user equipment using the selected microframe pilot pattern.

An embodiment dynamic pilot solution defines several RS patterns and uses a given pattern at a given time depending on the channel conditions. The pattern is chosen according to several parameters, such as:

(1) Time: the UE mobility determines the coherence time of the channel. The coherence time determines how fast the channel conditions change. The higher the coherence time, the lower the density of pilots in time needs to be.

(2) Frequency: similarly, depending on the delay spread, a coherence bandwidth of the channel is defined. The higher the coherence bandwidth, the lower the density of pilots in frequency needs to be.

(3) Number of supported spatial layers: the amount of pilots symbols needed increase with the number of supported spatial layers, since each spatial layer needs to be independently estimated. The lower the number of supported spatial layers, the lower the number of pilot symbols.

(4) Signal to noise ratio (SNR)/signal plus interference to noise ratio (SINR) conditions: channel estimation is sensitive to noise level. In high noise level conditions, more pilot symbols are needed to accurately estimate the channel.

(5) Modulation: higher order modulations are more sensitive to channel estimation errors and may require more pilots than lower order modulations.

In order to adapt the amount of pilots needed for the current conditions, several RS patterns are defined. The RS patterns comprise two parts: a microframe pattern definition and a time pattern definition.

With respect to the microframe pattern definition, several patterns are defined to span the range of desired conditions over a microframe. An example of a set of patterns 100 is given in FIG. 1. The set of patterns 100 of FIG. 1 presents the following characteristics:

(1) Configuration A is a pattern that is sparse in time and frequency, with few resource elements reserved for RS transmission. It would be suitable for channels with large coherence bandwidth (e.g., ITU PED A model), relatively low mobility conditions, and good SNR/SINR conditions.

(2) Configuration B is similar to configuration A, but with 4× more REs reserved for RS transmissions. It is suitable for the same conditions as Configuration A, but in lower SNR/SINR conditions.

(3) Configuration C is sparse in frequency, but not in time. It would be suitable for channels with large coherence bandwidths, and high velocity, such as what is frequently encountered on highways. Note that this configuration can also be used in low velocity environments, with the pilots on the two time symbols used for energy accumulation rather than time variations.

(4) Configuration D is for high delay spread, low mobility channels.

(5) Configuration E is for high delay spread, high velocity channels (e.g., GSM TU channel).

(6) Configuration F is a null configuration without any pilot. It can be used to define more elaborate channels (as discussed below), or to indicate that there will be no pilot at all on a given subframe. On such a subframe, the UE may not perform any channel estimation at all.

The above configurations are just examples, and different placements (for example in diamond-like fashion) are allowed. It is described in this way because, in an embodiment, one distinguishing property between the configurations is the density, not a particular location or location fashion (rectangular, diamond, etc.).

In addition, a pattern is defined on the subframe: in many conditions, the pilots do not need to be present on each subframe. Thus, the microframe patterns are combined to define an overall pattern over the subframe.

Figure 2:
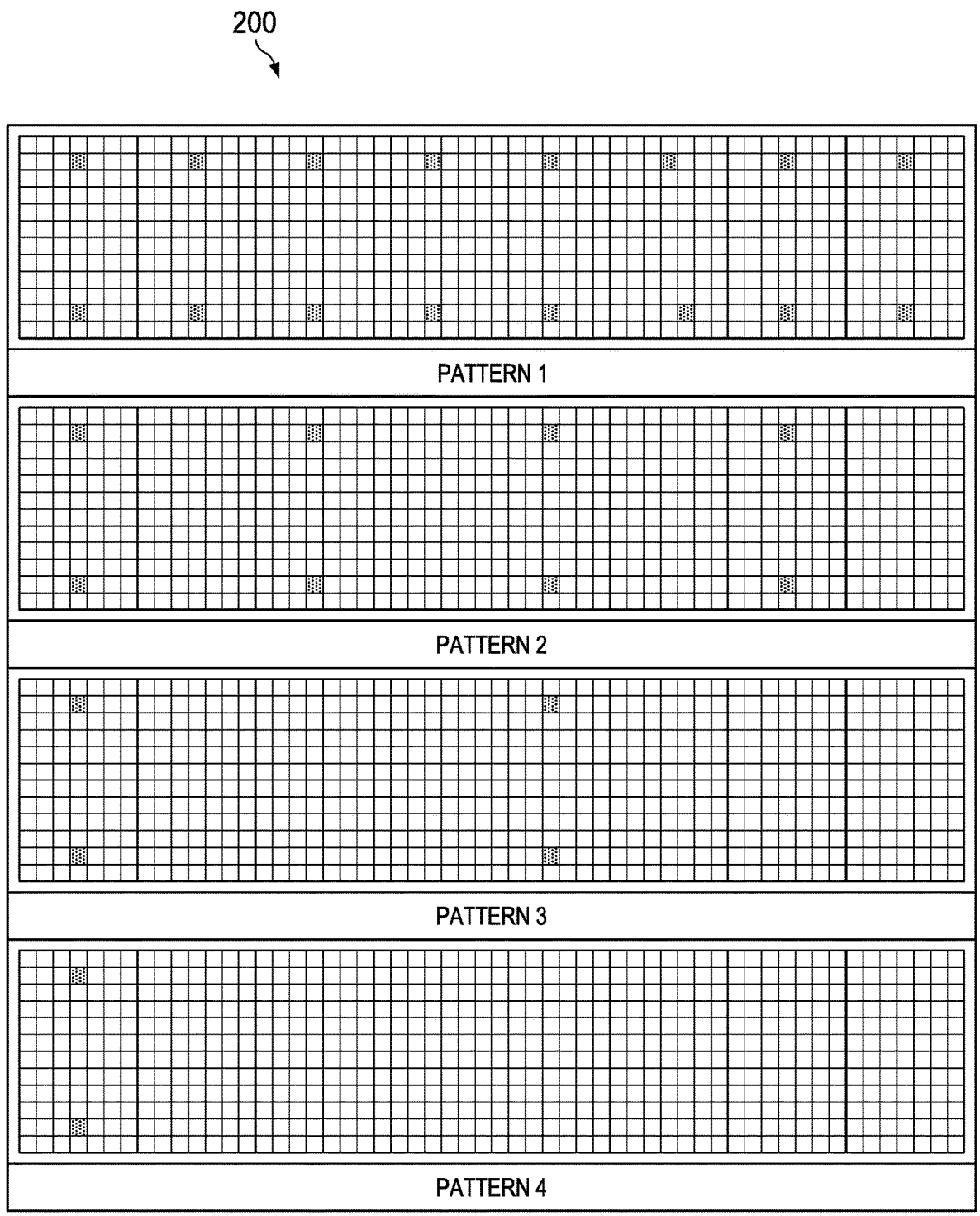
FIG. 2 illustrates examples of subframe patterns.

FIG. 2 gives an example of 4 possible patterns 200 using microframe configuration A as the baseline pattern. The sets of patterns 200 of FIG. 2 present the following characteristics. Pattern 1 is the regular, non-adaptive pattern configuration, with pilots on each subframe. Patterns 2, 3, 4, are patterns with less and less pilots for low mobility conditions. Note that the reductions in overhead achieved by using microframe and subframe patterns can be drastic: using configuration A and pattern 4, the pilot overhead is 0.3%. In contrast, DMRS overhead for current LTE is 8.5% for one layer.

As explained previously, the pilot pattern comprises a microframe pattern and a subframe pattern. Several overall pattern indexings are possible:

(1) Single indexing over a subframe: in an embodiment, all the supported patterns on a subframe are indexed with a single value (one-dimension table). Altogether, single indexing creates #microframe patterns *#subframe patterns possible configurations.

(2) Double indexing: the overall pattern is references by two values: the microframe pattern (e.g., configuration B), and the subframe pattern (e.g., pattern 2) as (B,2).

(3) An 8-field bitmap, with field #i indicating which microframe pattern to use on microframe #i.

The enhanced node B (eNB) can signal the pattern in several ways.

First, with dedicated radio resource control (RRC) signaling and no offset. If the configuration changes infrequently, the eNB may send the pattern configuration using RRC signaling. The eNB and UE operations are shown in FIGS. 3 and 4.

Figure 3:
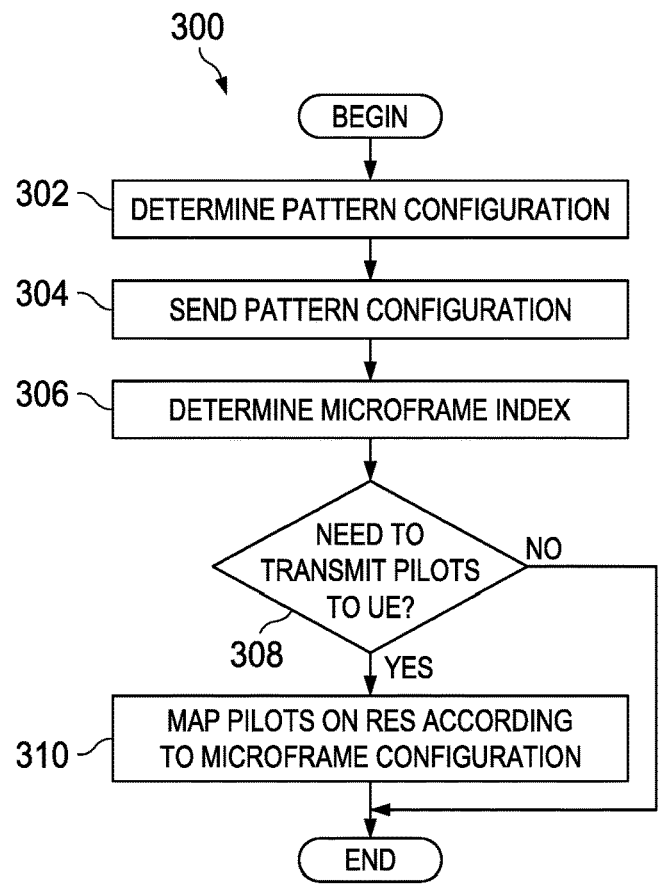
FIG. 3 illustrates an embodiment of eNB operation.

FIG. 3 is a flowchart of an embodiment of a method 300 in an eNB for adaptive pilot mapping and configuration. The operation in the eNB is as follows. At block 302, the eNB determines a pattern configuration. At block 304, the eNB transmits an RS configuration (both subframe and microframe) to the UE. Then, at block 306, on a given subframe, the eNB determines the microframe index. At block 308, the eNB determines if there is a need to transmit the pilots to the UE. If, at block 308, there is no need to transmit the pilots to the UE, then the method 300 may end. However, if, at block 308, there is a need to transmit pilots to the UE on this particular subframe, the method proceeds to block 310 where the eNB maps the pilots according to the microframe pattern, after which, the method 300 may end. On the UE side, on each microframe it has to receive, the UE assumes that the RS is mapped according to the microframe pattern.

Figure 4:
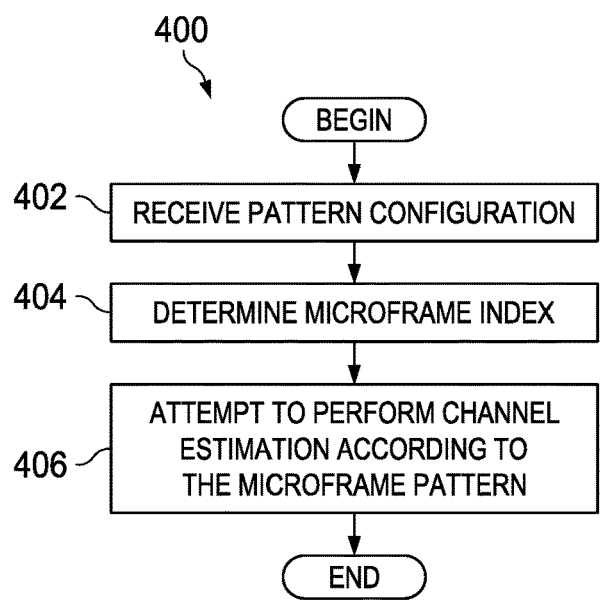
FIG. 4 illustrates an embodiment of UE operation.

FIG. 4 is a flowchart of an embodiment of a method 400 in a UE for channel estimation using adaptive pilots. The method 400 begins at block 402 where the UE receives the pattern configuration from the eNB. At block 404, the UE determines the microframe index. At block 406, the UE attempts to perform channel estimation according to the microframe pattern, after which, the method 400 may end.

With dedicated RRC signaling and an offset, the immediately preceding solution has a potential disadvantage in that it introduces scheduling restrictions. For instance, in an embodiment, if pattern 4 of FIG. 2 is used, the control channel can be sent on microframe #0 of each subframe, since it is the one that has pilots.

One approach to avoid this problem is to have the UE attempting to do channel estimation using the microframe pattern of microframe #0. When the control channel (e.g., EPDCCH) is received and demodulated with the pattern of microframe #0, the UE considers this microframe as microframe 0 regardless of the microframe index (hence the offset), and utilizes the subframe pattern from now on. In addition, a timer may be used to revert to the behavior of always using the pattern of microframe #0 after a given time if no transmission from the eNB is received after a time T.

The maximum update rate of the pilot pattern is every subframe. If the RRC signaling informs the UE of the pattern (which microframes and where in a microframes the pilots are), the UE knows exactly where the pilots are.

If the RRC signaling informs the UE of the positions of the pilots in a microframe then the UE has no knowledge which microframe it is, so the UE attempts blind detection of the pilots starting from microframe #0, and unless the UE has knowledge whether pilots are transmitted every x microframes, the UE will attempt pilot detection every microframe. In an embodiment, the UE should at least know that the pilots are inserted every x microframes even if it does not know if the first microframe carries pilots. This ensures that once the pilots are found, then the next ones will be located within x microframes away. This also ensures that further blind detection on next microframe is not necessary, thereby reducing the receiver's processing burden. In other words pilot blind detection is performed once for a given pilot allocation in time. The next one will be used once pilot locations are changed.

Third, a reference microframe pilot configuration may be used. The immediately preceding solution ensures fast transition to the RS subframe pattern, but may lack robustness for some applications. Thus, a more robust variation is presented here. By default, the UE uses a reference microframe configuration (known by: preconfiguration, configuration via RRC common/dedicated signaling, etc.). When the eNB wants to switch the UE to the dynamic/adaptive configuration, it sends a command to the UE. The UE may then optionally send an ACK to the eNB. Then, both eNB and UE switch to the dynamic/adaptive configuration and find the REs occupied by the RS according to the microframe pattern configuration. The command that the eNB sends may be sent through a downlink control information (DCI), existing or new. One solution is to have one bit in the DCI. When the bit is toggled, the UE switches from the reference pattern to the dynamic/adaptive pattern, or from the dynamic/adaptive pattern to the reference pattern.

As another alternative, some microframes/subframes may have a known pilot configuration, and the pilot configuration may not be adaptive on that particular microframe: for instance, the pilot configuration on microframe #0 could be fixed to a known configuration. This configuration should be conservative to make sure all UEs have a subframe where sufficient number of pilots is present. The UE and eNB operations are shown in FIGS. 5 and 6.

Figure 5:
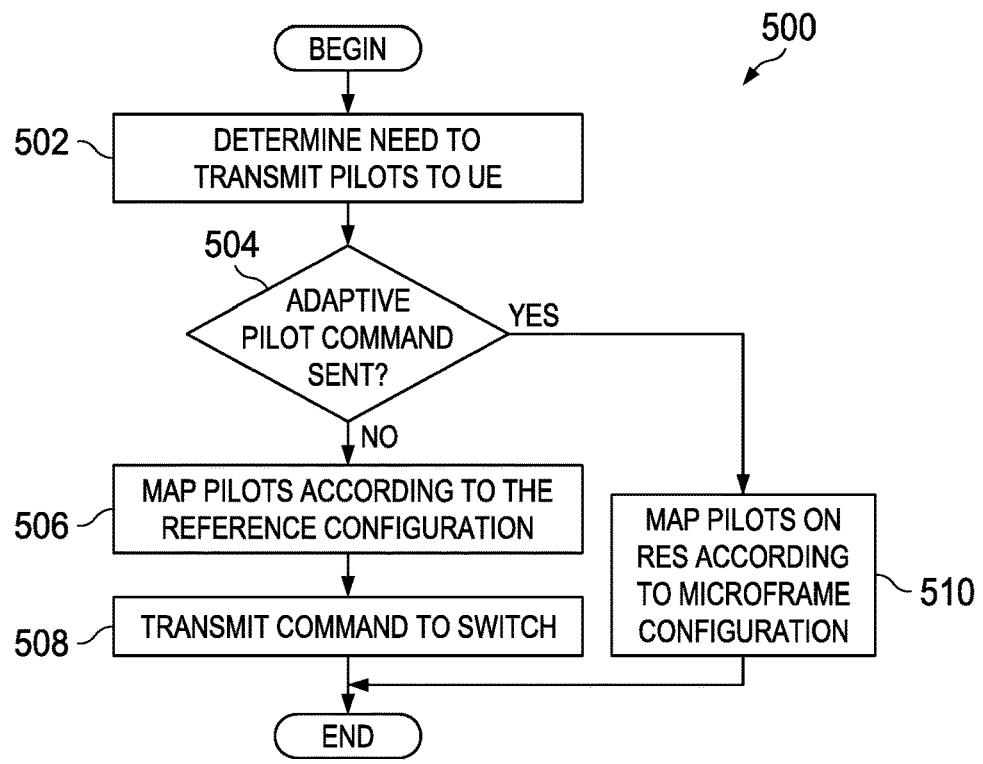
FIG. 5 illustrates an embodiment of eNB operation.

FIG. 5 is a flowchart of an embodiment of a method 500 in an eNB for pilot configuration. The method 500 begins at block 502 where the UE determines the need to transmit pilots to a UE. At block 504, the eNB determines if an adaptive pilot command has been sent. If, at block 504, it is determined that an adaptive pilot has been sent, then the method 500 proceeds to block 510 where the eNB maps the pilots in the resources according to the microframe configuration, after which, the method 500 may end. If, at block 504, it is determined that the adaptive pilot has not been sent, then the method 500 proceeds to block 506 where the eNB maps the pilots according to the reference configuration. At block 508, the eNB transmits the command to switch to the adaptive pilot to the UE, after which, the method 500 may end.

Figure 6:
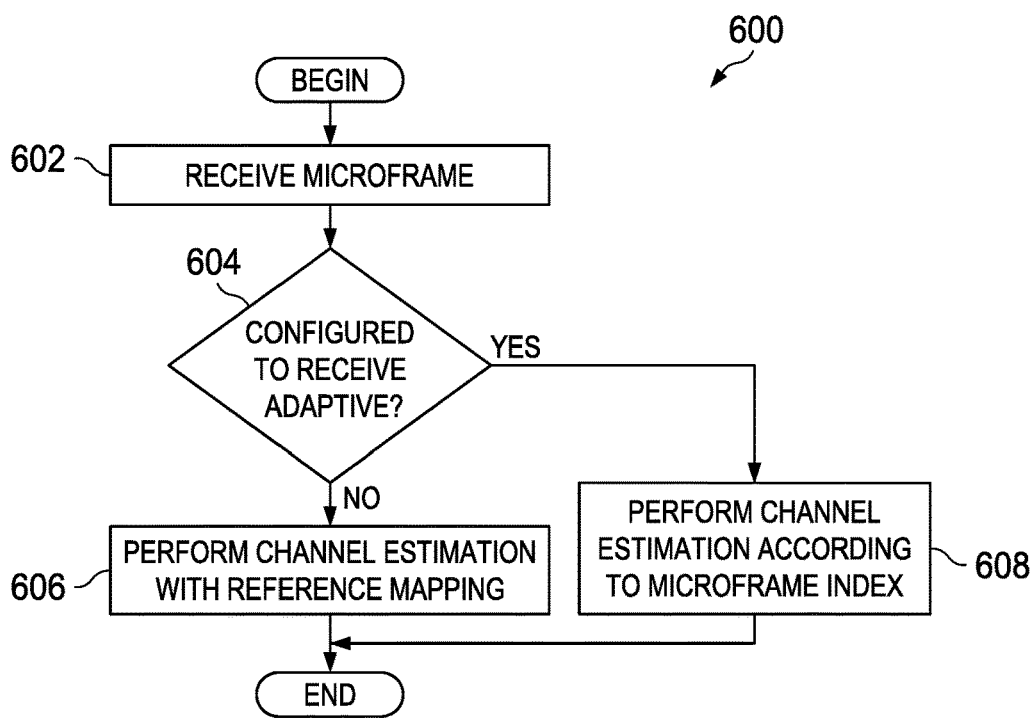
FIG. 6 illustrates an embodiment of UE operation.

FIG. 6 is a flowchart of an embodiment of a method 600 in a UE for receiving a pilot configuration and performing channel estimation. The method 600 begins at block 602 where the UE receives the microframe from the eNB. At block 604, the UE determines whether the UE is configured to receive adaptive pilot allocation. If, at block 604, the UE determines that it is not equipped for adaptive pilot allocation, then the method 600 proceeds to block 606 where the UE performs channel estimation with reference mapping, after which, the method 600 may end. If, at block 604, the UE determines that it is equipped for adaptive pilot allocation, the method 600 proceeds to block 608 where the UE performs channel estimation according to the microframe index, after which, the method 600 may end.

Signaling described here is UE specific. This can be also non-UE specific, either addressing a group of users (or even for the entire cell, although less likely). The eNB broadcasts this signal to the users, and then will change the transmission pattern of the pilots for each user after receiving acknowledgement. Since ACK can fail, there should be a mechanism to repeat the signaling or a timer (when timing expires, no signaling is sent and the pilot pattern remains the same). This applies either if the signaling is UE specific or not.

Fourth, physical (PHY) layer signaling can be used. There are cases where it is useful to adaptively select the pilot configuration. In such a case, the adaptive pilot configuration can be performed as follows.

(1) A reference pilot configuration is used to demodulate a DCI, a particular pattern used can be set in RRC.

(2) The DCI indicates the pilot configuration for the next subframe—it can be predefined configuration or it can be totally new characterized by some parameters to adapt best to the channel conditions experienced. Both options could be called dynamic (where pilot patterns from a finite set are chosen) and adaptive (where pilot patterns are computed from channel spread parameters and populated accordingly), respectively. In an embodiment, the adaptive mode is a generalization of the dynamic mode and is described in greater detail below.

Reference pilot configuration is always used on microframe #0, DCI sent on subframe 0 to indicate the pilot configuration for the rest of the subframe. This information could be sent in the physical control format indicator channel (PCFICH) and applicable to all UEs that will be scheduled in this subframe. There will be a new physical channel to carry this information for a group of UEs. This new channel should always be transmitted in microframe 0 if the information is for the UEs scheduled in that subframe. If the information is for UEs that are not necessarily scheduled in that same subframe, it is still good to have in the first microframe so there is no uncertainty for the UE.

Another option is to have this non-UE specific signal at the frame level, and then the updates, as needed, are UE-specific and signaled through DCI. This frame level signal can also be used to signal no change in pilot pattern (keep using the current pilots) or revert to default pilot pattern. In both cases no pilot pattern is expected in the DCI field for that frame. In this embodiment, the signal contains the information of no change or revert, but not which configuration to use.

While the dynamic mode has been presented above, the adaptive mode is the subject of the following discussion. One difference is that in dynamic pilot configuration the pilot locations are known beforehand and taken from some predefined set, whereas in adaptive mode those pilot locations are derived according to the channel related parameters and based on those parameters pilot locations are derived. Dynamic mode converges to adaptive mode when the number of the allowed pilot locations is large (pilot location pattern book is large).

In an embodiment, in order to populate pilots optimally, parameters like coherence time and bandwidth should be computed. However, these computations should occur after reliable channel gains are obtained via a channel estimation procedure. Note that these calculations can also be used in dynamic pilots mode and based on the results, a closest pattern configuration can be selected from a finite (and in some embodiments, rather small) pattern codebook.

The accuracy of channel estimation depends on a number of factors, but the most important one is signal-to-noise (SNR) level in the channel. In noisy situations when SNR is low, channel estimates might be very unreliable. In order to increase the reliability averaging over number of symbols can be done. However, it increases overhead and does not guarantee good estimates. Therefore here it is assumed that adaptive pilots can be used when channel is sufficiently good, for example in moderate to high SNR conditions. If SNR is low then predefined fixed pattern is used. This pattern will be rather dense with pilots spaced closely apart. The receiver can estimate noise level and can use this information to enable/disable adaptive pilot mode. Now that the channel estimates are available coherence parameters can be calculated.

With respect to computation of optimal pilot location, coherence bandwidth as well as coherence time can be estimated by performing correlation operation on channel estimates and could be obtained from regular pilots or special reference symbols called resolution pilots. Those pilots would have a special structure and there would be two types of them to evaluate correlation in time and frequency, respectively. More details are provided below in the resolution pilots discussion.

Naturally, in the case of frequency domain channel estimation, correlation operation can produce a number of coherence bandwidths present in the channel. This would suggest that for a given chunk of frequency resource different pilot density could be used. This is an optimal approach, but carries additional computational burden and creates unwanted implementation issues. Therefore, if a number of coherence bands is identified the pilot spacing in subsequent transmissions is chosen by taking into account the smallest coherence bandwidth from all the computed ones.

The procedure of computing coherence bandwidths based on frequency channel estimation could be as follows and for illustrative purposes is also presented below in the resolution pilots discussion.

(1) Store frequency pilot in memory (signal Y)
(2) Actual channel estimation with interpolation
  (a) Estimate channel gains (H) on each subcarrier by using the knowledge of static predefined pilots.

(3) Correlation evaluation (a) Choose subcarrier $S_0$ and perform correlation between subcarrier $S_0$ and subsequent subcarriers (b) Once, the correlation value decreases to 0.9 for a given subcarrier $S_1$ choose the subcarrier $S_1$ as a starting point for new set of correlation coefficient evaluation. Store the distance between $S_1$ and $S_0$, it is the first 90% coherence bandwidth value $B_1$. The threshold value of correlation coefficient can be chosen freely between 0, ..., 1, the lower it is, the poorer performance (but at the same time less pilots) is expected.

(c) Perform correlation with the remaining subcarriers until the point $S_2$ when correlation value decreases to 0.9 and evaluate second 90% coherence BW value $B_2$.

(d) Repeat points 3-5 until all subcarriers are examined and a number of coherence bandwidths is obtained $\{B_1, B_2, \ldots, B_N\}$ (e) Choose the smallest coherence bandwidth from the set above $B^* = \min\{B_1, B_2, \ldots, B_N\}$ (f) Use value $B^*$ as a unified coherence bandwidth that determines frequency pilot spacing for the whole observed band (the whole band of signal Y)

In an embodiment, a similar procedure can be used when evaluating coherence time with an exception being that one coherence time will be computed and assumed for deriving pilot spacing (no minimization procedure) in time. Here it is assumed that all subcarriers change in time in a similar way. Also the time correlation can be evaluated on the fly continuously and if conditions change, pilot spacing can be updated. The estimation above is affected by noise level and therefore can be distorted.

Figure 7A:
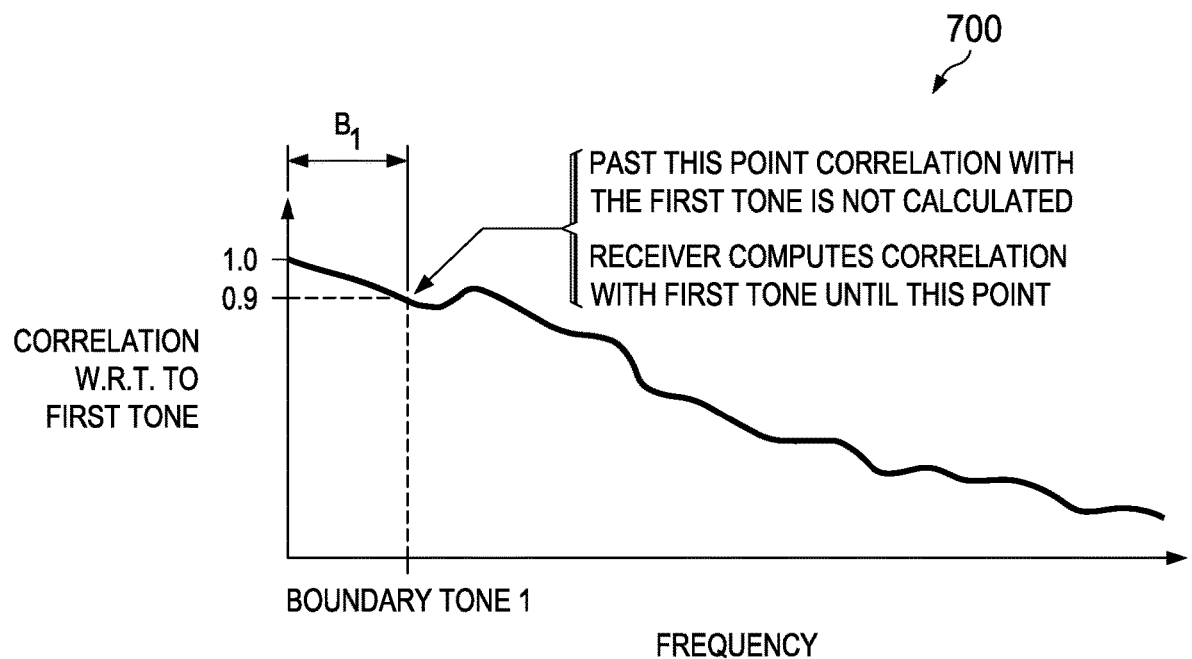
FIGS. 7A, 7B, and 7C illustrate coherence bandwidths evaluation.
Figure 7B:
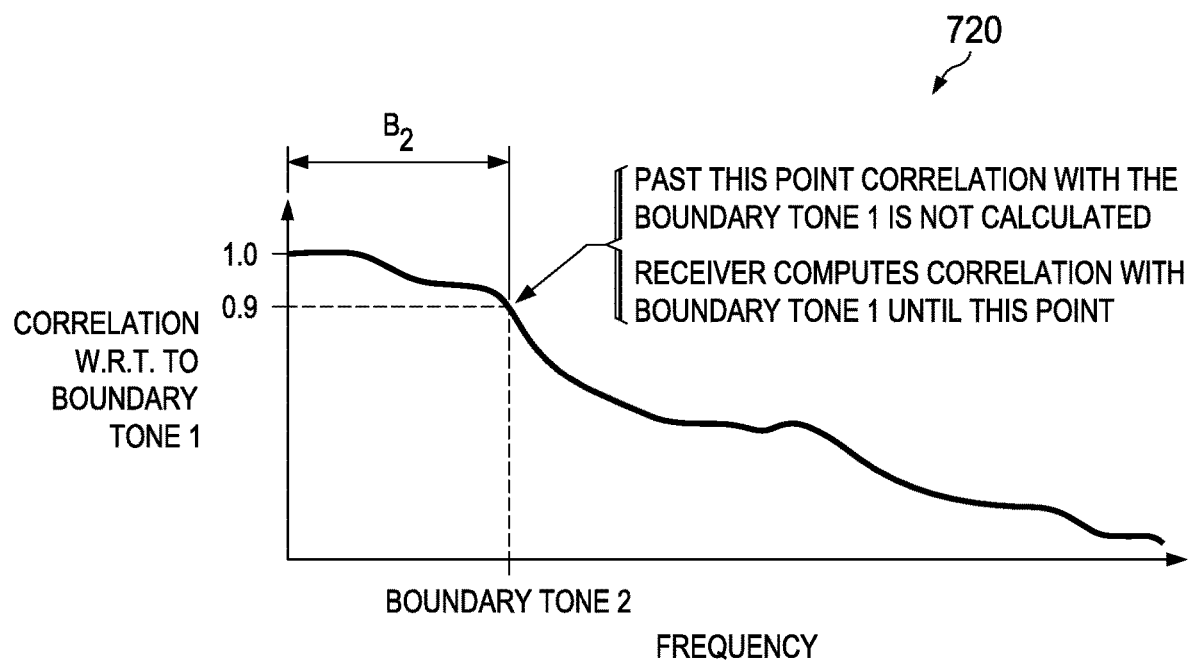
Figure 7C:
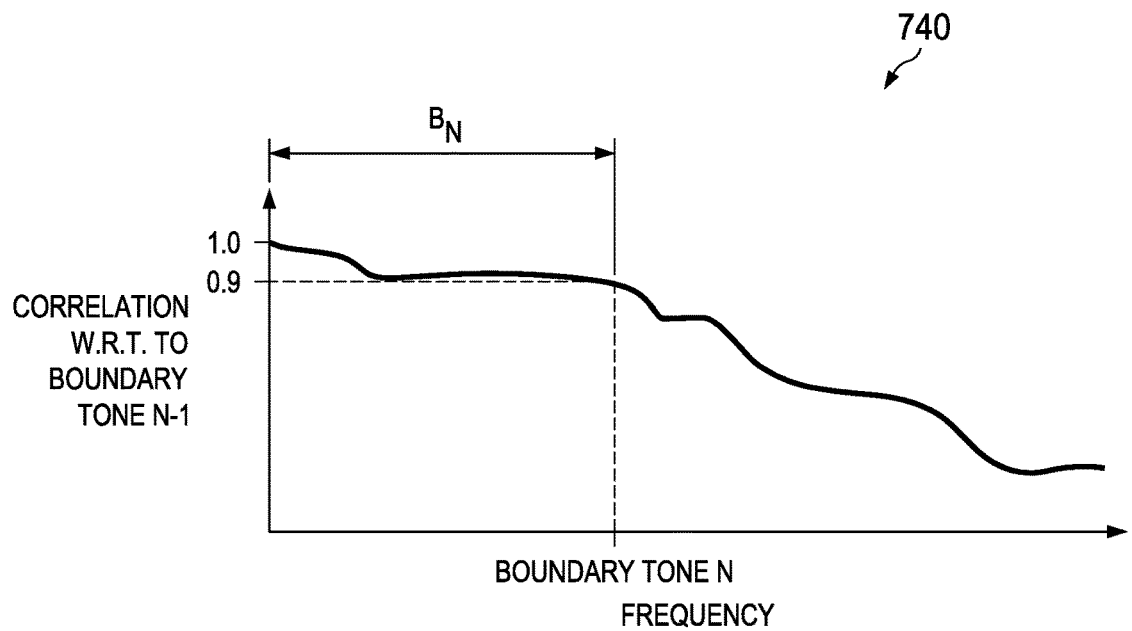

FIGS. 7A, 7B, and 7C illustrate coherence bandwidths evaluation. FIG. 7A shows a graph 700 of coherence bandwidth evaluation at boundary tone 1. FIG. 7B shows a graph 720 of coherence bandwidth evaluation at boundary tone 2. FIG. 7C shows a graph 740 of coherence bandwidth evaluation at boundary tone N. In both the above described methods of correlation estimation (frequency/time), in order to reduce the impact of noise, averaged correlation over a number of subframes can be utilized. This lengthens the observation time, but yields more noise resistant estimates.

With respect to utilizing time domain channel estimation, delay spread estimation can be also used in time domain and from that the coherence bandwidth can be derived. It is performed by estimating frequency components of the channel and performing inverse discrete Fourier transform (DFT) to obtain time characteristics (power delay profile (PDP)). Ignoring low power taps, delay spread can be estimated and converted into coherence bandwidth, which will affect frequency separation of pilots $\Delta_f$. Also, it is possible to estimate delay spread directly in the time domain without reverting to frequency domain. The choice of the method is broad and does not affect the scope of this disclosure.

With respect to indicating adaptive pilot locations, after obtaining coherence parameters the pilot population can be performed according to the following formula:

Equation 1. Computation of pilot locations.

$$I = p_0 + (m-1)\Delta$$

$$m = 1, \ldots, m^*$$

$$m^* = \left\lfloor \frac{\# PRB \cdot \Phi - p_0}{\Delta} + 1 \right\rfloor$$

where I represents time/frequency indices of pilots signals, $p_0$ is a starting point of the first pilot in time/frequency, $\Delta$ is time/frequency spacing of pilots expressed in the unit of tones/OFDM symbols. $\Phi$ is the number of tones/symbols per PRB and #PRB is a number of PRBs considered. For example we want to calculate indices of pilot signals in frequency (indices of pilot tones) for the following configuration: $\Delta_f=5$ tones, #PRB=11, $\varphi_f=12$ tones/PRB, starting tones $p_0=3$.

Then:

Equation 2. Numerical example of pilot location computation $$m^* = \left\lfloor \frac{\# PRB \cdot \Phi - p_0}{\Delta} + 1 \right\rfloor = 26$$

$$m = 1, \ldots, 26$$

$$I = 3, 8, 13, \ldots, 128$$

tones 3, 8, 13, ... 128 contain pilots. Analogous computation can be carried out for the time dimension. The disclosed methods of populating pilots are very simple and intuitive. However, other, perhaps more sophisticated, methods are not precluded and do not alter the scope of this disclosure.

All of the above procedures can be also utilized in dynamic pilot mode and with the utilization of rounding and approximation to the most suitable pilot pattern from the set of predefined patterns. For example if the computation gives $\Delta_f=7$ subcarriers, but the predefined patterns have let us say $\{3, 6, 12, 24, 48\}$ subcarriers spacing the one with 6 will be chosen as the closest to the desired 7. In an embodiment, to guarantee good performance, always rounding to the lowest number closest to the computed one should be adopted. This will result in pilot spacing denser than optimal allocation obtained from the actual channel.

In an embodiment, with respect to protocol and message exchange, in order to enable adaptive pilots the receiver capabilities have to be known to the transmitter. There can be an RRC message ADAPTIVE_PILOTS_CAPABLE. The receiver transmits this information together with other parameters in the initial phase of communications. Also there can be a receiver category which immediately makes it known for the transmitter what capabilities the receiver has and whether it can use pilot adaptation or not. It is analogous to the user transmitter/receiver category already existing in LTE standard.

The subsequent discussion assumes that the receiver is capable of adaptive pilot reception, measurement of spread parameters (not needed in some cases when reciprocity is utilized, i.e. in TDD mode) and communication of them to the transmitter, i.e., ADAPTIVE_PILOTS_CAPABLE=TRUE. The transmitter is capable of the same. The receiver is also capable of receiving a message ADAPTIVE_PILOTS_ACK_OK informing that transmitter acknowledges the change requested by the receiver and following subframes are using requested adaptive pilots.

At the initial stage, the transmitter utilizes fixed pilot pattern, which can be signaled to the receiver in DCI similarly as in the case of dynamic pilots described before. There can be many fixed pattern pilots. Apart from that the receiver computes spread parameters by monitoring resolution pilot signals or the DMRS/CRS pilots itself. Once they are computed and the necessity of changing the pilots is discovered, the receiver sends adaptive pilot request ADAPTIVE_PILOT_REQ=TRUE together with four integer numbers (later referred to as "spread parameters" or simply "parameters"):

(1) maximum number of subcarriers between pilot symbols $\Delta_f$ (pilot spacing in frequency), (2) location of the first pilot in frequency $f_0$, (3) maximum number of symbols between pilots $\Delta_t$ (pilot spacing in time), (4) location of the first pilot in time $t_0$.

Initial locations $f_0$, $t_0$ actually might depend on $\Delta_{f,t}$ parameters. For example $f_0=\Delta_f$ or $f_0=\Delta_f/2$ and so on. In the other case the values $f_0$ and $t_0$ can be just fixed, for example $f_0=1$ and $t_0=1$. This means the first resource element (RE) in frequency and time. Other values are also possible. If initial locations are fixed or set beforehand, $\Delta_t$ and $\Delta_f$ might need to be actually communicated to perform adaptation.

Those parameters can be communicated within CSI feedback. Then those parameters can be signaled in additional new field in CSI feedback message in both periodic (using physical uplink control channel (PUCCH)) and aperiodic (using physical uplink shared channel (PUSCH)) CSI reporting. This piece of information may be called adaptive pilots configuration field (APC). Alternatively, when fixed pilots are requested then APC can contain an index of the predefined pilot pattern, to reduce the signaling overhead and comply with dynamic pilots described previously. Once the transmitter agrees to change the pilot configuration according to the receiver's request it sends a higher layer message to the receiver ADAPTIVE_PILOT_OK=TRUE. Once the receiver obtains this information it assumes new updated pilot pattern, the one it requested. If it does not receive this message or the message is ADAPTIVE_PILOT_OK=FALSE then it proceeds with the current pilot locations and nothing changes. ADAPTIVE_PILOT_OK bit could be sent as MAC message. There is a possibility that the communication reverts from adaptive pilot mode to dynamic or even static pilot mode after some time. Reverting to fixed predefined pilot configuration could be performed periodically, for example every N radioframes. This period could be set in RRC.

In an embodiment, it may also happen that the transmitter allows for change of pilots but chooses different configuration than the receiver requested. It might happen in the situation that the transmitter serves two or more users and both request pilot change and their requests are not the same. Then the transmitter must decide on the common configuration (worst case one—with the densest configuration of all configurations requested). Such a situation might occur in multiuser or multiuser MIMO communications. In such case, in an embodiment, the transmitter has to inform about the pilots for instance in MAC message.

Figure 8:
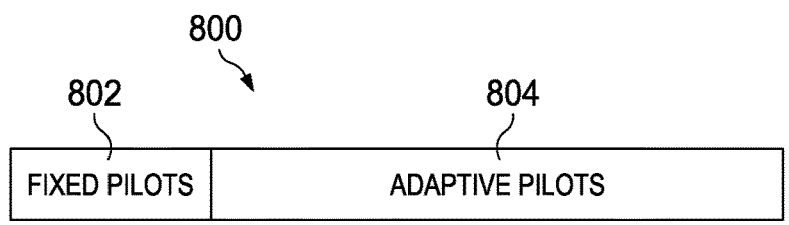
FIG. 8 illustrates time division of fixed/adaptive pilots.

FIG. 8 illustrates time division 800 of fixed/adaptive pilots with fixed pilots 802 occupying a first time division and adaptive pilots 804 occupying a second time division.

Figure 9:
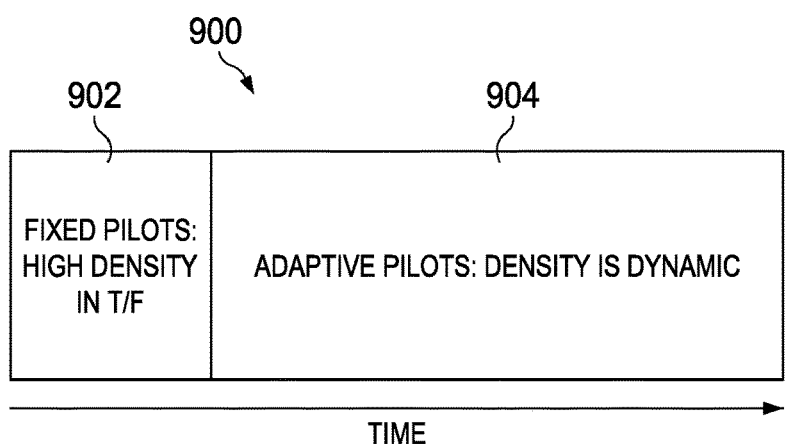
FIG. 9 illustrates a preferred configuration.

FIG. 9 illustrates an embodiment configuration time division 900 of fixed/adaptive pilots. Fixed pilots 902 with high density in time and frequency occupy a first time division and adaptive pilots 904 whose density is dynamic occupy a second time division.

In an embodiment, the density of pilots in fixed pilot period has to be sufficient to account for possibly high dynamics in the channel that might be present during the initial phase. To cover such extreme cases the best approach is to transmit pilots densely in fixed pilot period (for example Configuration E, pattern 1) and then as shown in FIG. 9 switch to adaptive period with pilot density calculated in fixed pilot period. This switch is negotiated between transmitter and receiver based on receiver's feedback of optimal adaptive pilot parameters. In the simplest case, it can be assumed that the first subframe uses fixed high density pilots and subsequent subframes operate according to calculated optimal pilots in the fixed pilot period.

During adaptive pilots period there should also be performed dynamic adjustments of pilot density. Receiver performs spread estimation and once it changes significantly the adjustment procedure can be invoked again. It might be achieved by repeating the procedure above using UCI resource and negotiating using ADAPTIVE_PILOT messages.

Another possibility is the use of reciprocity to reduce the processing burden on the mobile receiver and estimate spread parameters in the transmitter for example using sounding reference signals (SRS) transmitted by the receiver. After computing the parameters for SRS the transmitter could signal optimal pilot configuration in DCI and this new pattern would apply to the very next or subsequent subframe(s) as already described above.

Four example cases may be identified for dynamic and adaptive pilots with channel coherence parameters computer either in the receiver or in the transmitter. When the computation is performed at the transmitter then it is based on SRS message from the receiver. Additionally, this can also be accomplished by monitoring the pilots embedded in uplink messages from the receiver.

Case 1: Dynamic pilots with spread parameters computation at the transmitter (eNodeB). Here regular transmission with predefined pilots is performed and once in a while receiver sounds the channel by transmitting SRS message using which the transmitter can derive the channel and based on that chose new pilot configuration or keep the existing one. The pilot configuration is signaled in DCI.

Figure 10:
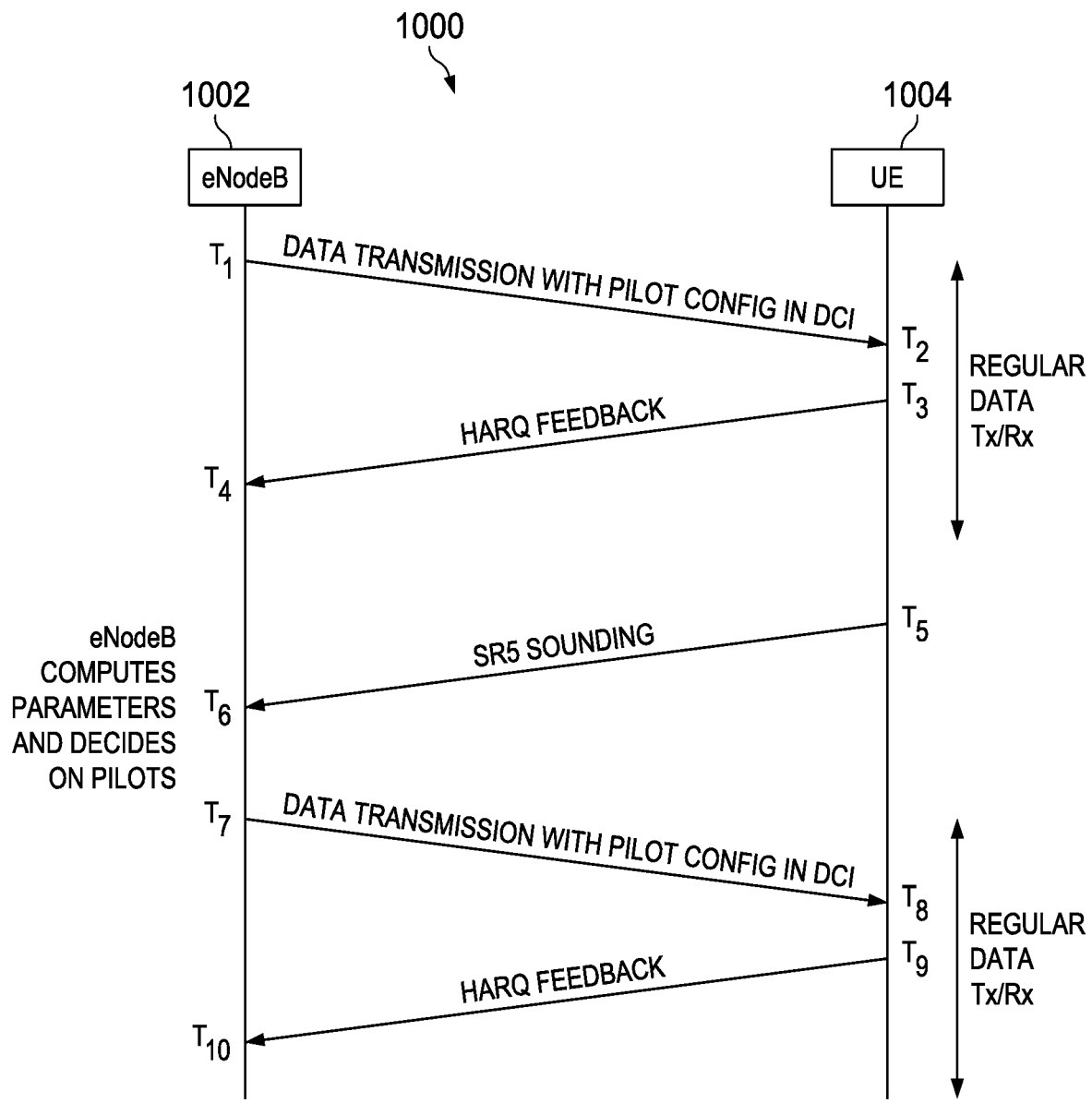
FIG. 10 illustrates dynamic pilots with computation at the transmitter.

FIG. 10 is a message flow diagram illustrating an embodiment method 1000 for using dynamic pilots with computation at the transmitter. The method 1000 begins at time T1 where the eNB 1002 transmits data with a pilot configuration in the DCI to the UE 1004. The UE receives the data transmission at time T2 and transmits hybrid automatic repeat request (HARQ) feedback to the eNB 1002 at time T3. At time T4, the eNB receives the HARQ feedback. At time T5 (which can be before, equal to, or after time T4), the UE 1004 transmits an SRS sounding signal to the eNB 1002. At time T6, the eNB 1002 receives the SRS sounding signal from the UE 1004 and then computes parameters according the SRS sounding signal and determines pilots according to the parameters. At time T7, the eNB 1002 transmits data with the pilot configuration in the DCI to the UE 1004. The UE 1004 receives the data and pilot configuration at time T8. At time T9, the UE 1004 transmits HARQ feedback to the eNB 1002, which receives the HARQ feedback at time T10.

Case 2: Dynamic pilots with spread parameters computation at the receiver (UE). This is similar to the above one, but the spread computation is computed in the receiver and is signaled in CSI feedback message. Based on that the transmitter chooses the best configuration and as before signals it in DCI.

Figure 11:
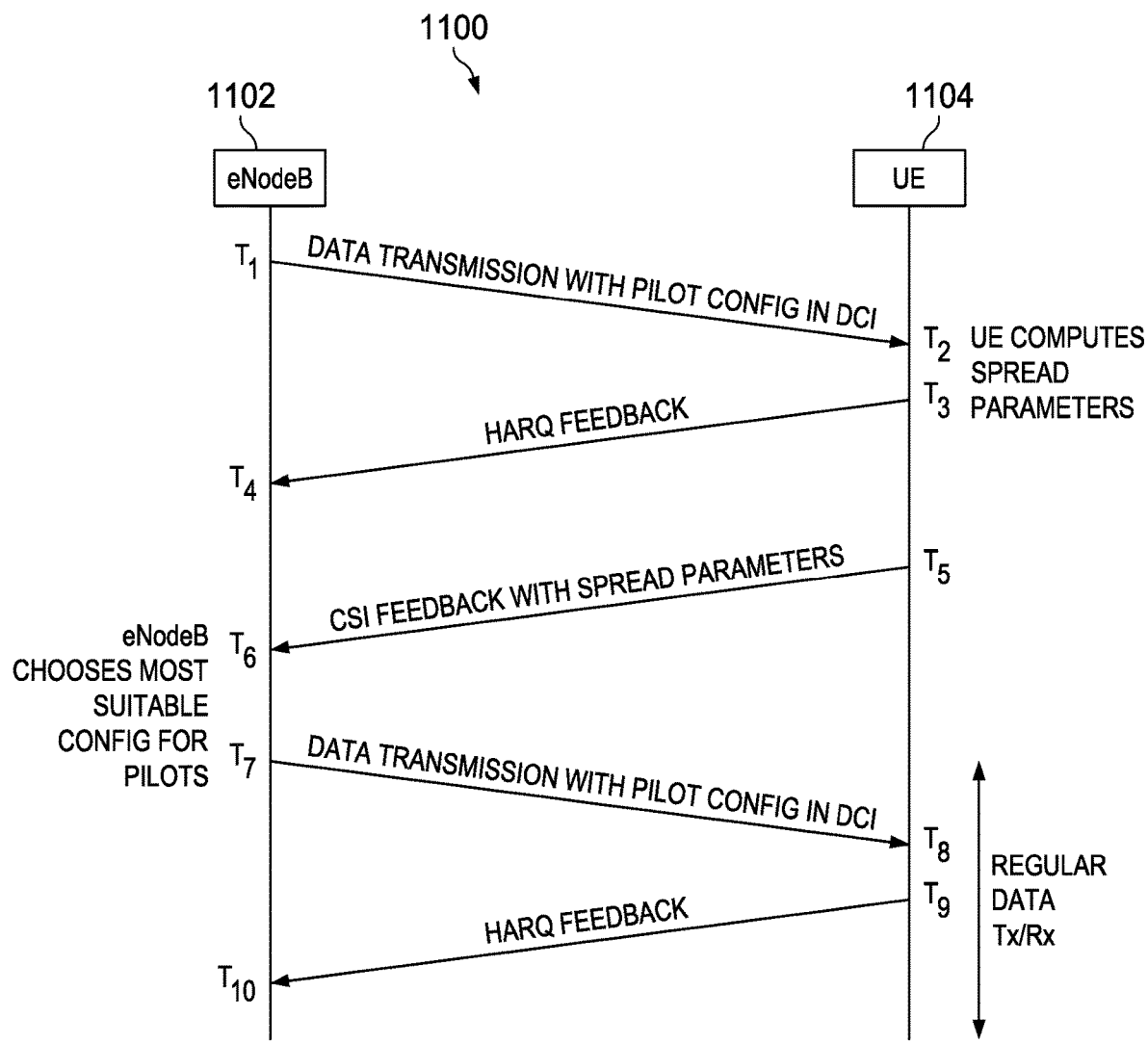
FIG. 11 illustrates dynamic pilots with computation at the receiver.

FIG. 11 is a message flow diagram illustrating an embodiment method 1100 for using dynamic pilots with computation at the receiver. The method 1100 begins at time T1 where the eNB 1102 transmits data with a pilot configuration in the DCI to the UE 1104. The UE receives the data transmission at time T2, computes spread parameters, and transmits HARQ feedback to the eNB 1102 at time T3. At time T4, the eNB 1102 receives the HARQ feedback. At time T5 (which can be before, equal to, or after time T4), the UE 1104 transmits CSI feedback with spread parameters to the eNB 1102. At time T6, the eNB 1102 receives the CSI feedback with spread parameters from the UE 1104 and then selects the most suitable configuration for the pilots according to CSI feedback and/or spread parameters. At time T7, the eNB 1102 transmits data with the pilot configuration in the DCI to the UE 1104. The UE 1104 receives the data and pilot configuration at time T8. At time T9, the UE 1104 transmits HARQ feedback to the eNB 1102, which receives the HARQ feedback at time T10.

Case 3: Adaptive pilots with spread parameters computation at the transmitter (eNodeB). In this case the transmitter computes channel spread parameters using SRS sounding from the receiver or alternatively from pilots observed in the uplink. Once computed they are placed in DCI and uniquely identify the pilot locations for the receiver.

Figure 12:
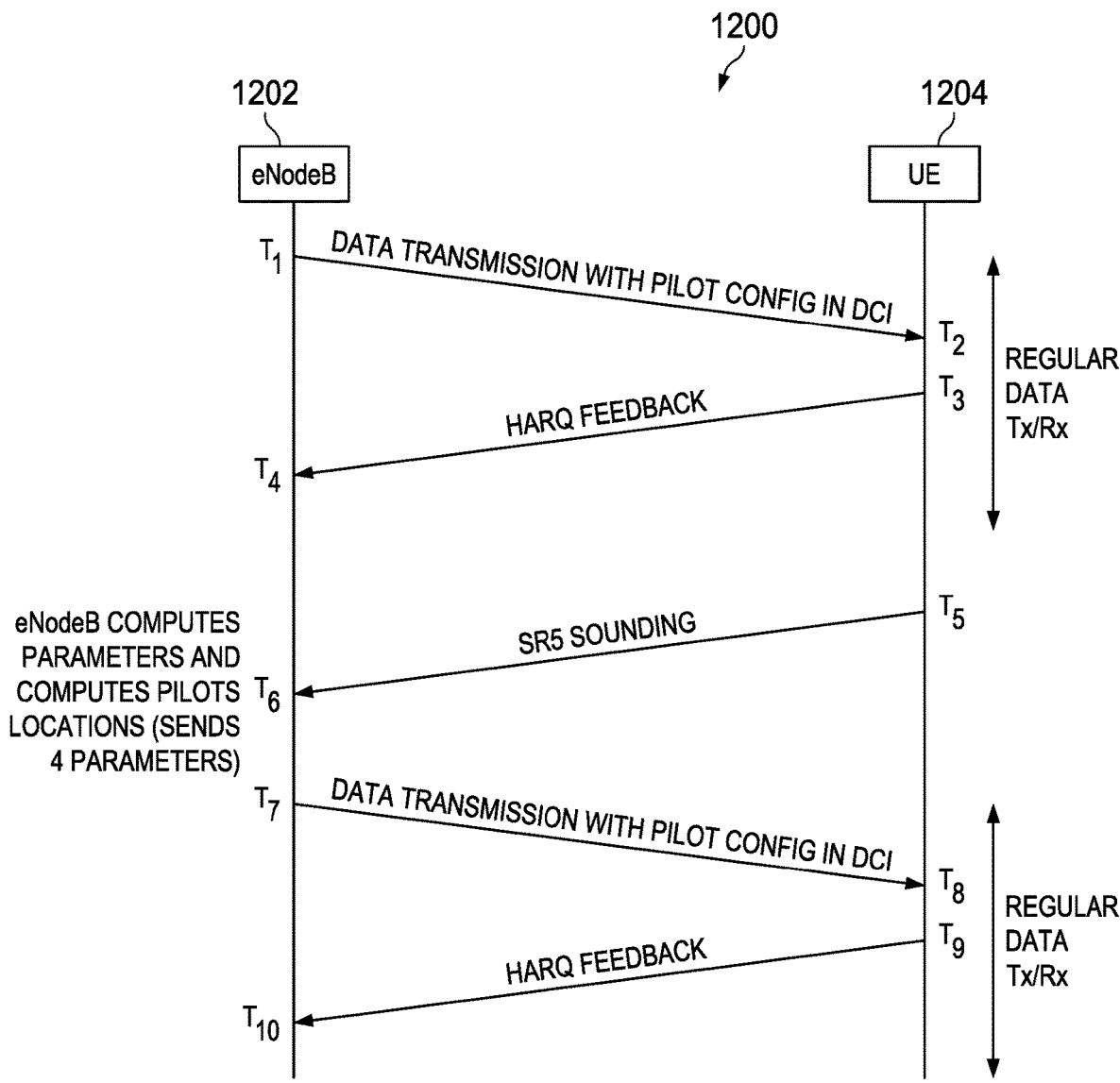
FIG. 12 illustrates adaptive pilots with computation at the transmitter.

FIG. 12 is a message flow diagram illustrating an embodiment of a method 1200 for using adaptive pilots with spread parameters computation at the transmitter. The method 1200 begins at time T1 where the eNB 1202 transmits data with a pilot configuration in the DCI to the UE 1204. The UE 1202 receives the data transmission at time T2 and transmits HARQ feedback to the eNB 1202 at time T3. At time T4, the eNB receives the HARQ feedback. At time T5 (which can be before, equal to, or after time T4), the UE 1204 transmits an SRS sounding signal to the eNB 1202. At time T6, the eNB 1202 receives the SRS sounding signal from the UE 1204 and then computes parameters and pilot locations according the SRS sounding signal. In an embodiment, the pilot parameters include four parameters. In an embodiment, the four parameters include a maximum number of subcarriers between pilot symbols $\Delta f$ (pilot spacing in frequency), location of the first pilot in frequency f0, maximum number of symbols between pilots $\Delta t$ (pilot spacing in time), and the location of the first pilot in time t0. In an embodiment, each of the four parameters is an integer number. At time T7, the eNB 1202 transmits data with the pilot configuration in the DCI to the UE 1204. The UE 1204 receives the data and pilot configuration at time T8. At time T9, the UE 1204 transmits HARQ feedback to the eNB 1202, which receives the HARQ feedback at time T10.

Case 4: Adaptive pilots with spread parameters computation at the receiver (UE). In this case the receiver computes spread and communicates them to the transmitter using CSI feedback. The transmitter makes a decision whether to alter pilot configuration. If the change is approved the pilot locations are transmitted to the receiver in DCI. Note that these pilot parameters (locations) can be different than those sent on CSI feedback by the transmitter. This might occur in multiuser situations, where transmitter decides on pilot locations based on feedback from two or more receivers.

Figure 13:
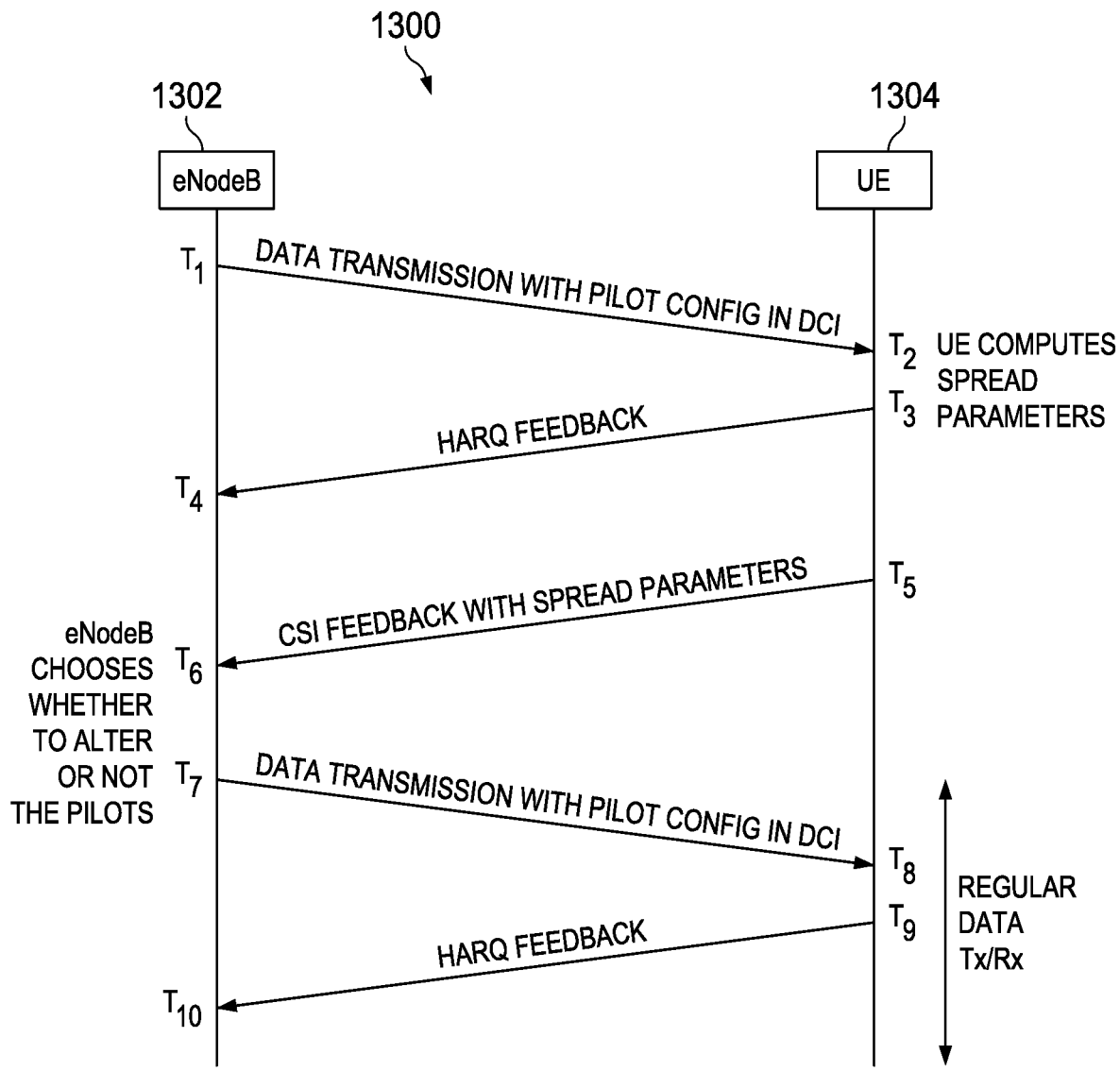
FIG. 13 illustrates adaptive pilots with computation at the receiver.

FIG. 13 is a message flow diagram illustrating an embodiment of a method 1300 for using adaptive pilots with spread parameters computation at the receiver. The method 1300 begins at time T1 where the eNB 1302 transmits data with a pilot configuration in the DCI to the UE 1304. The UE receives the data transmission at time T2, computes spread parameters, and transmits HARQ feedback to the eNB 1302 at time T3. At time T4, the eNB 1302 receives the HARQ feedback. At time T5 (which can be before, equal to, or after time T4), the UE 1304 transmits CSI feedback with spread parameters to the eNB 1302. At time T6, the eNB 1302 receives the CSI feedback with spread parameters from the UE 1304 and then determines whether or not to alter the pilot parameters according to CSI feedback and/or spread parameters. At time T7, the eNB 1302 transmits data with the pilot configuration in the DCI to the UE 1304. The UE 1304 receives the data and pilot configuration at time T8. At time T9, the UE 1304 transmits HARQ feedback to the eNB 1302, which receives the HARQ feedback at time T10.

One issue with adaptive pilots is the communication of spread parameters (4 integer numbers; maybe 2, when putting an assumption on the starting locations of pilots being functions of separation parameters $\Delta t$ and $\Delta f$ as discussed before) in the DCI. This approach may require the addition of many bits in this compact field, which can be prohibitive. The remedy for this is the transmission of spread parameters using higher layer messages (medium access control (MAC) messages) and signaling the change in DCI, for example using bit toggling. The bit is toggled when new most recent parameters are taking effect. In this way the functionality is preserved and, in an embodiment, only 1 extra bit in DCI is needed. Toggling at the transmitter should occur when the transmitter is absolutely certain that the receiver received correctly high layer message containing the spread parameters. These operations are conceptually shown in FIGS. 14 and 15, for the case of 1 user and 2 and more users (in general K users) for the case when parameters are computed in the transmitter (reciprocity can be utilized). If they are computed in the receiver (reciprocity cannot be utilized) then "SRS" as well as "Transmitter computes spread parameters" is replaced with "CSI feedback."

Figure 14:
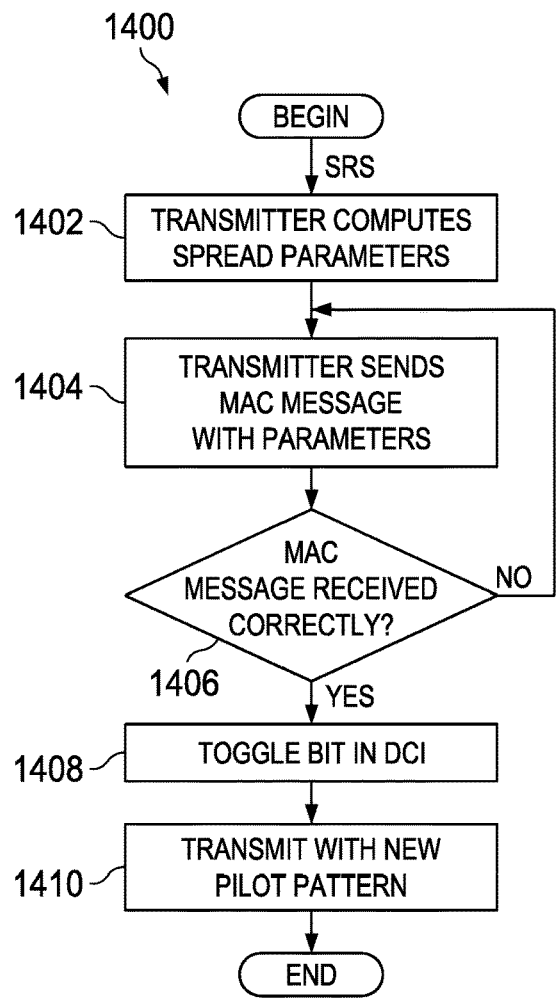
FIG. 14 illustrates an embodiment procedure for transmitting pilot configuration to the receiver and signaling it by bit toggling in DCI.

FIG. 14 is a flowchart of an embodiment of a method 1400 using adaptive pilots with the toggling. The method 1400 begins at block 1402 where the transmitter receives a SRS signal from a UE and computers the spread parameters according to the SRS received from the UE. At block 1404, the transmitter sends a MAC message to the UE with the computed pilot parameters. At block 1406, the transmitter determines whether the MAC message was received correctly and, if not, the method 1400 proceeds back to block 1404 where the transmitter resends the MAC message with parameters. If, at block 1406, the MAC message was received correctly by the UE, then the method 1400 proceeds to block 1408 where the transmitter toggles the bit in DCI. At block 1410, the transmitter transmits the new pilot pattern with the one bit toggled in the DCI, after which, the method 1400 may end.

Figure 15:
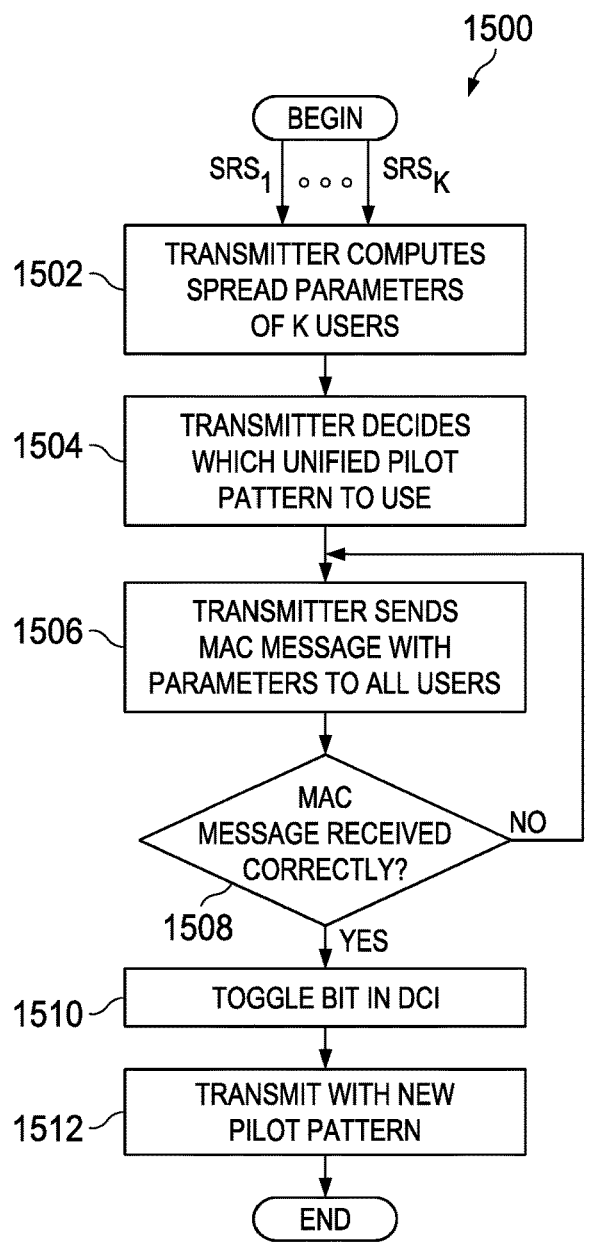
FIG. 15 illustrates an embodiment procedure for transmitting pilot configuration to the receiver and signaling it by bit toggling in DCI.

FIG. 15 is a flowchart of an embodiment of a method 1500 using adaptive pilots with toggling with multiple UEs. The method 1500 begins at block 1502 where the transmitter receives K SRS signals from K UEs and computes the spread parameters for the K users. At block 1504, the transmitter decides which unified pilot pattern to use according to the spread parameters. At block 1506, the transmitter sends the MAC message with the parameters to all users. At block 1508, the transmitter determines whether the MAC message was received correctly by all users and, if not, the method proceeds to block 1506 where the transmitter resends the MAC message with the parameters to all users. If, at block 1508, the MAC message was received correctly by the users, then the method 1500 proceeds to block 1510 where the transmitter toggles a bit in the DCI. At block 1512, the transmitter transmits the new pilot pattern with the toggled bit in the DCI, after which, the method 1500 may end.

A fallback mode also may be used. There is continuously a chance that during adaptive pilot period the communications might be forced to revert to a dynamic mode with a specified pattern(s). Most likely it would be a return to high density pilots. Reverting to this known predefined configuration could be performed when it is discovered that channel estimation does not deliver satisfactory results. It can happen that a block of data is not positively acknowledged for a number of consecutive attempts. In such case it is very possible that channel estimation is wrong due to for example too sparse pilots. The remedy for that would be to return to fixed known static pilots and in fact repeat the above process of fixed and then adaptive pilots as in FIG. 8. This drastic change could be called fallback mode and in such case fixed pilot configuration period is densely populated with pilots to regain good channel estimates. The receiver could signal the need to fallback mode using UCI or MAC massages.

Another possibility is to use fixed pilot period where EPDCCH is located to assure it is accurately received (those pilots are located on EPDCCH search space). Then the receiver can easily detect if the channel estimation is wrong and therefore can decide to go to fallback mode based on that information.

Figure 16:
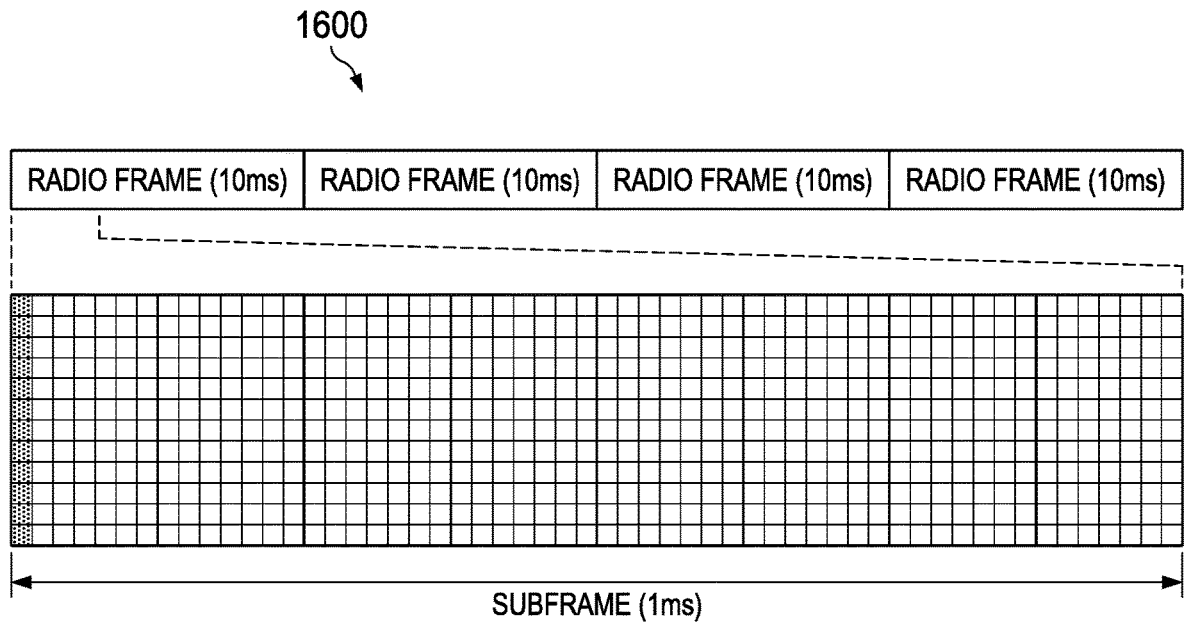
FIG. 16 illustrates a coherence bandwidth resolution pilot.

With respect to resolution pilots, in order to compute and to continue monitoring spread parameters special pilots could be utilized and embedded in the signal. The ideal characteristics can be as follows. A system 1600 for frequency (coherence bandwidth) estimation pilot is envisioned to be a wideband pilot occupying large number of subcarriers, but sent rarely, for example once every radioframe or even less often as shown in FIG. 16. The periodicity could be signaled in upper layers like RRC. The number of pilots necessary also depends on SNR level. Here it is assumed that moderate to high SNR is available. For low SNR cases more than one pilot is needed to perform reasonably good channel estimation.

Figure 17:
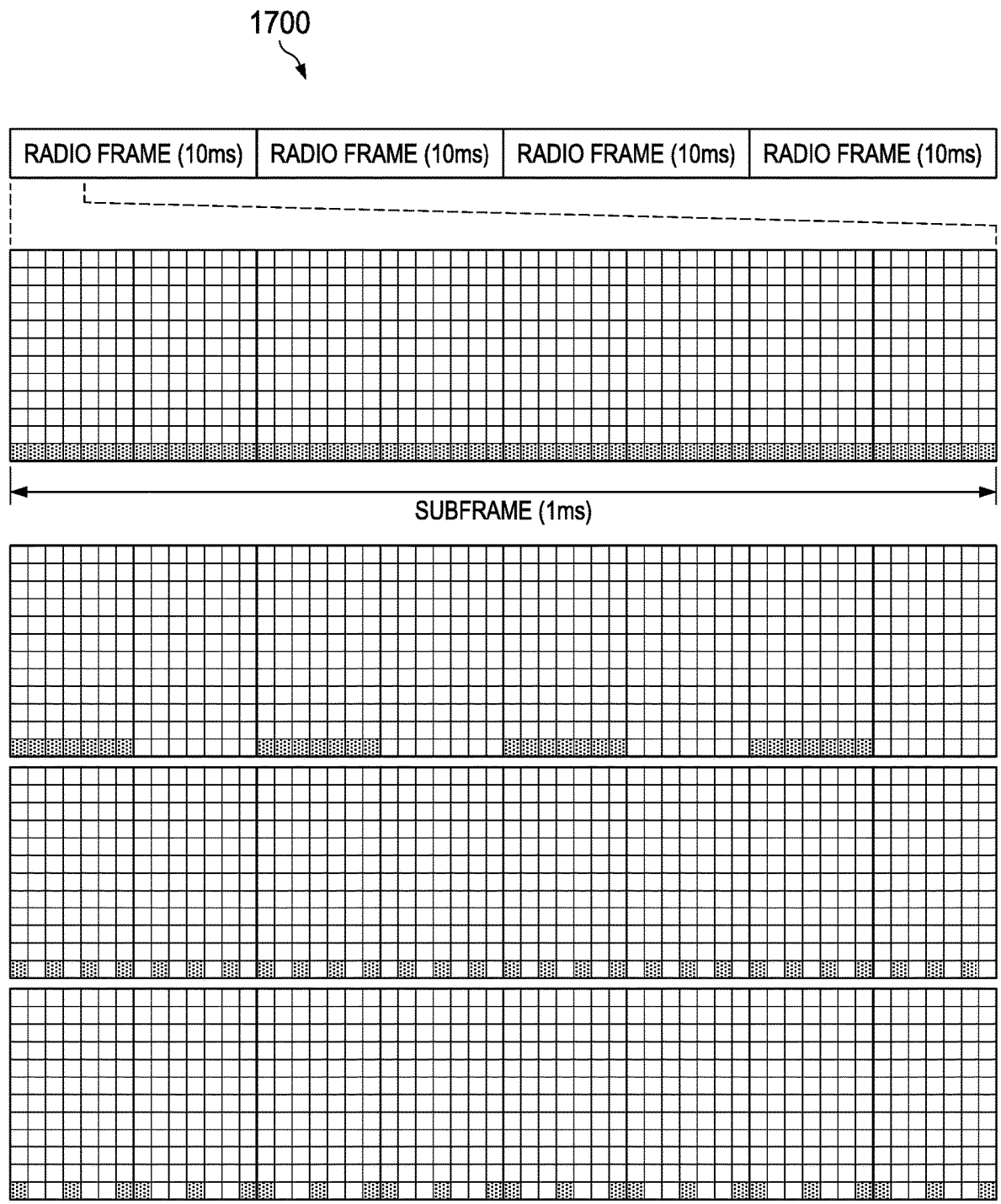
FIG. 17 illustrates coherence time resolution pilot variants.

Similarly for coherence time calculation, a narrowband signal which spans over the entire transmission duration could be used. This signal could be also transmitted periodically with periodicity set in RRC. The coherence time pilot structures 1700 are shown in FIG. 17. Naturally many variants of such signal are possible and they can be distinguished by the duty cycle (periodicity and duration) or location in frequency (does not need to be on the edge of the PRB, could be located towards the middle for instance).

Note that in the figure, the time resolution pilot is shown on one subcarrier only. Note that the time resolution pilot could occupy multiple subcarriers to obtain faster estimation. For instance, the time resolution pilot could occupy one subcarrier every N subcarriers.

Figure 18:
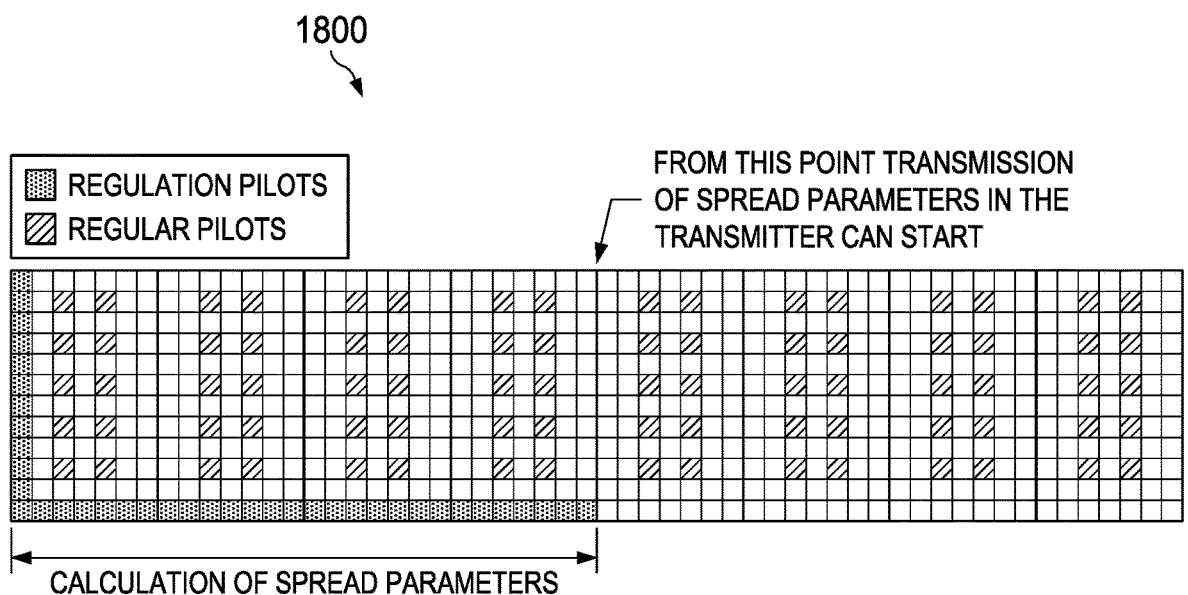
FIG. 18 illustrates an example of muting the resolution pilots.

It is possible that resolution pilots could be muted and their function replaced by regular pilots (adaptive, dynamic or static) to reduce overhead. Then coherence parameters estimation could be of reduced resolution/precision, however this could be still sufficient in vast majority of practical situations, where not too much channel variation is present. Another possibility also exists. In the initial stage the dedicated resolution pilots could be transmitted and once the regular pilots according to parameters are computed, resolution pilots are muted and data or other information is transmitted in its place. The duration of those resolution pilots would have to be determined in a way that they last until receiver computes spread parameters. After this moment the resolution pilots disappear and can again reappear when fallback mode is called for example. In an embodiment, these resolution pilots can be present in fixed pilots mode and disappear in adaptive pilot mode. Example of this operation 1800 is presented in FIG. 18. The placement of regular pilots as well as resolution pilots is arbitrary and many other variations are allowed.

Although the disclosed systems and methods have been described herein primarily with reference to an eNB, those of ordinary skill in the art will recognize that the disclosed systems and methods are not limited to operation in an eNB, but can be applied to other types of transmission points, access points, controllers, and the like.

Figure 19:
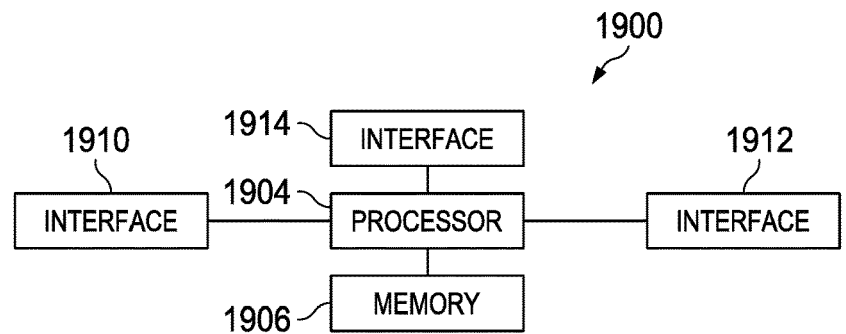
FIG. 19 illustrates a block diagram of an embodiment processing system for performing methods described herein.

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown the figure. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in the figure, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1910, 1912, 1914 connects the processing system 1900 to a transceiver adapted to transmit and receive signaling over the telecommunications network.

Figure 20:
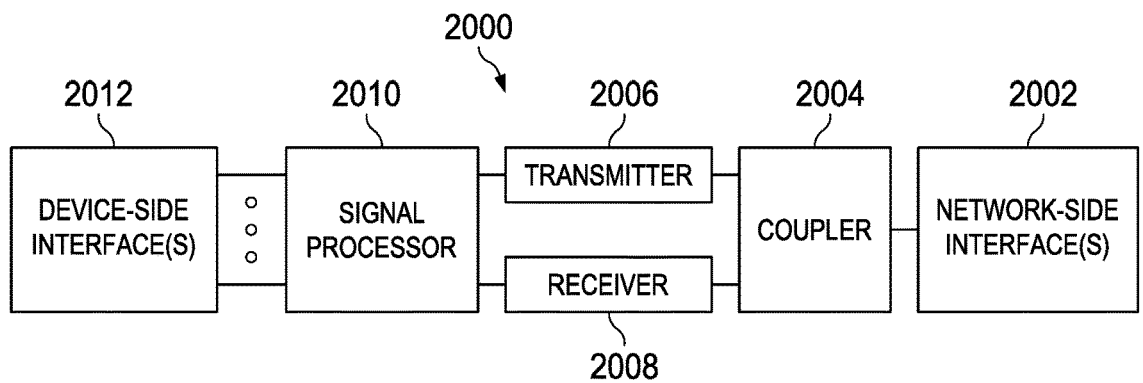
FIG. 20 illustrates a block diagram of a transceiver adapted to transmit and receive signaling over a telecommunications network.

FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components and levels of integration may vary from device to device.

Figure 21:
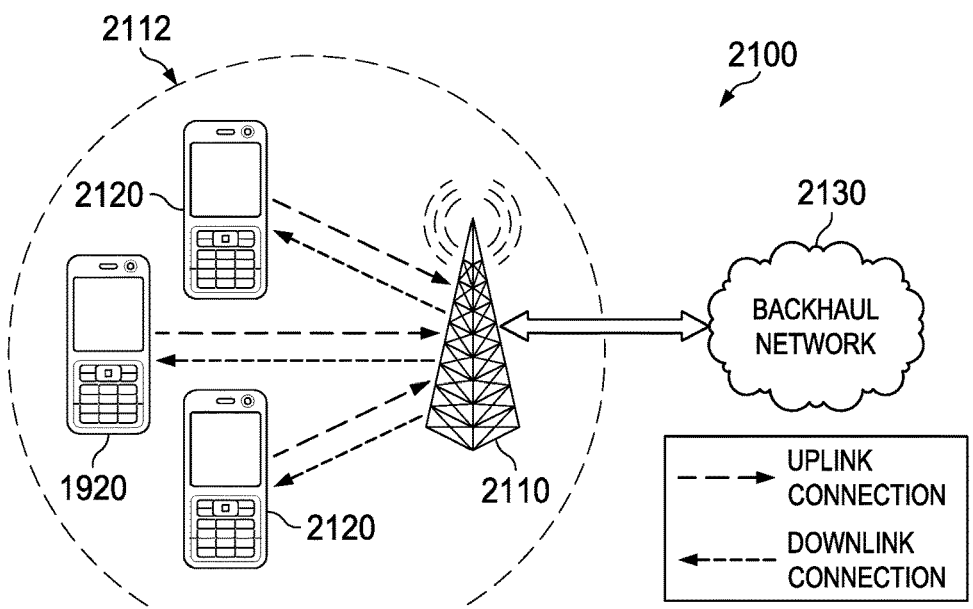
FIG. 21 illustrates an embodiment network for communicating data in which the disclosed methods and systems may be implemented.

FIG. 21 illustrates an embodiment network 2100 for communicating data in which the disclosed methods and systems may be implemented. The network 2100 includes an access point (AP) 2110 having a coverage area 2112, a plurality of stations (STAs) 2120, and a backhaul network 2130. In an embodiment, the AP may be implemented as transceiver 2000 shown in FIG. 20. In an embodiment, the STAs 2120 may be implemented as, for example, processing system 1900 shown in FIG. 19. As used herein, the term AP may also be referred to as a TP and the two terms may be used interchangeably throughout this disclosure. The AP 2110 may include any component capable of providing wireless access by, inter alia, establishing uplink (dashed line) and/or downlink (dotted line) connections with the STAs 2120. The STAs 2120 may include any component capable of establishing a wireless connection with the AP 2110. Examples of STAs 2120 include mobile phones, tablet computers, and laptop computers. The backhaul network 2130 may be any component or collection of components that allow data to be exchanged between the AP 2110 and a remote end (not shown). In some embodiments, the network 2100 may include various other wireless devices, such as relays, femtocells, etc.

It should be appreciated that one or more steps of the embodiment methods provided herein may be performed by corresponding units or modules. For example, a signal or packet may be transmitted by a transmitting unit or a transmitting module. A signal or packet may be received by a receiving unit or a receiving module. A signal or packet may be processed by a processing unit or a processing module. Determining a channel condition parameter may be performed by a channel condition determining unit or module. Selecting a microframe pilot pattern may be performed by a selecting unit or selecting module. The respective units/modules may be hardware, software, or a combination thereof. For instance, one or more of the units/modules may be an integrated circuit, such as field programmable gate arrays (FPGAs) or application-specific integrated circuits (ASICs).

An embodiment method in a communication controller for adaptive pilot allocation includes determining at least one channel condition parameter for a wireless channel between the communications controller and a user equipment (UE). The method includes selecting a microframe pilot pattern to use for subsequent communications on the wireless channel according to the at least one channel condition parameter. Additionally, the method includes signaling an indication of the selected microframe pilot pattern to the user equipment. The method further includes transmitting data to the UE using the selected microframe pilot pattern.

In an embodiment, the determining the at least one channel condition parameter includes transmitting, by the communications controller, a pilot signal to the UE. The determining also includes receiving channel state information (CSI) feedback from the UE. The CSI feedback includes at least one spread parameter calculated by the UE. The determining also includes determining, by the communication controller, the at least one channel condition parameter according to the at least one spread parameter. In an embodiment, the at least one spread parameter includes a maximum number of subcarriers between pilot symbols, a location of a first pilot in frequency, a maximum number of symbols between pilots, and a location of the first pilot in time.

In an embodiment, the determining the at least one channel condition parameter includes receiving, by the communications controller, a sounding reference signal (SRS) message from the UE. The determining the at least one channel condition parameter also includes determining, by the communications controller, the at least one channel condition parameter according to the SRS message.

In an embodiment, the microframe pilot pattern is selected from a set of predefined microframe pilot pattern allocations. In an embodiment, selecting the microframe pilot pattern to use for subsequent communications on the wireless channel is performed according to feedback from at least two receivers. In an embodiment, signaling the indication of the selected microframe pilot pattern to the UE comprises signaling pilot parameters in a downlink control information (DCI). In an embodiment, the method also includes signaling a change in the pilot pattern through bit toggling.

An embodiment communications controller includes a processor and a non-transitory computer readable storage medium storing programming for execution by the processor. The programming including instructions for determining at least one channel condition parameter for a wireless channel between the communications controller and a user equipment (UE). The programming also includes instructions for selecting a microframe pilot pattern to use for subsequent communications on the wireless channel according to the at least one channel condition parameter. The programming further includes instructions for signaling an indication of the selected microframe pilot pattern to the UE. Additionally, the programming includes instructions for transmitting data to the UE using the selected microframe pilot pattern.

In an embodiment, the instructions for determining the at least one channel condition parameter include instructions for transmitting a pilot signal to the UE. The instructions for determining the at least one channel condition parameter also include instructions for receiving channel state information (CSI) feedback. The CSI feedback includes at least one spread parameter calculated by the UE. The instructions for determining the at least one channel condition parameter also include instructions for determining the at least one channel condition parameter according to the at least one spread parameter.

In an embodiment, the at least one spread parameter comprises a maximum number of subcarriers between pilot symbols, a location of a first pilot in frequency, a maximum number of symbols between pilots, and a location of the first pilot in time.

In an embodiment, the instructions for determining the at least one channel condition parameter include instructions for receiving a sounding reference signal (SRS) message from the UE. The instructions for determining the at least one channel condition parameter also include instructions for determining the at least one channel condition parameter according to the SRS message.

In an embodiment, the microframe pilot pattern is selected from a set of predefined microframe pilot pattern allocations. In an embodiment, selecting the microframe pilot pattern to use for subsequent communications on the wireless channel is performed according to feedback from at least two receivers. In an embodiment, signaling the indication of the selected microframe pilot pattern to the UE comprises signaling pilot parameters in a downlink control information (DCI). In an embodiment, the programming further includes instructions for signaling a change in the pilot pattern through bit toggling.

The following references are related to subject matter of the present application. Each of these references is incorporated herein by reference in its entirety:

3GPP TS 36.211 v12.5.0, "3rd Generation Partnership Project; Technical Specification Group Radio Access Network; Evolved Universal Terrestrial Radio Access (E-UTRA); Physical channels and modulation (Release 12) (2015-04).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communications, comprising:
receiving, by a first wireless device, information from a second wireless device, the information related to a channel condition for a wireless channel between the first wireless device and the second wireless device;
transmitting, by the first wireless device, an indication of a microframe pilot pattern in a subframe to the second wireless device, the microframe pilot pattern associated with positions of pilots in a microframe, wherein different microframe pilot patterns are associated with different positions of pilots in a microframe; and
transmitting, by the first wireless device, data and pilots to the second wireless device according to the microframe pilot pattern.

2. The method of claim 1, wherein the information related to the channel condition includes at least one of channel state information (CSI) feedback or at least one spread parameter calculated by the second wireless device.

3. The method of claim 2, wherein the at least one spread parameter comprises a maximum number of subcarriers between pilot symbols, a location of a first pilot in frequency, a maximum number of symbols between pilots, a location of the first pilot in time, or a combination thereof.

4. The method of claim 1, wherein receiving the information of the channel condition comprises receiving, by the first wireless device, a sounding reference signal (SRS) message from the second wireless device.

5. The method of claim 4, further comprising determining, by the first wireless device, at least one channel condition parameter according to the SRS message.

6. The method of claim 1, wherein the microframe pilot pattern is selected from a set of predefined microframe pilot pattern allocations.

7. The method of claim 1, further comprising selecting the microframe pilot pattern to use for subsequent communications with the second wireless device in the subframe on the wireless channel according to feedback from at least two receivers.

8. The method of claim 1, wherein transmitting the indication of the microframe pilot pattern to the second wireless device comprises transmitting pilot parameters in a downlink control information (DCI) or a radio resource control (RRC) message.

9. The method of claim 1, further comprising signaling a change in the pilot pattern through bit toggling.

10. The method of claim 1, wherein the microframe pilot pattern is an adjusted microframe pilot pattern that is different than an original microframe pilot pattern used for a previous data and pilot signal transmission from the first wireless device to the second wireless device.

11. The method of claim 1, further comprising receiving a capability parameter via radio resource control (RRC) signaling from the second wireless device prior to transmitting the indication of the microframe pilot pattern to the second wireless device, the capability parameter indicating whether the second wireless device supports adaptive pilots.

12. A first wireless device comprising:
a processor; and
a non-transitory computer readable storage medium storing programming for execution by the processor, the programming including instructions for:
receiving, from a second wireless device, information related to a channel condition for a wireless channel between the first wireless device and a second wireless device;
transmitting an indication of a microframe pilot pattern in a subframe to the second wireless device, the microframe pilot pattern associated with positions of pilots in a microframe, wherein different microframe pilot patterns are associated with different positions of pilots in a microframe; and
transmitting data and pilots to the second wireless device according to the microframe pilot pattern.

13. The first wireless device of claim 12, wherein the information related to the channel condition includes at least one of channel state information (CSI) or at least one spread parameter calculated by the second wireless device.

14. The first wireless device of claim 13, wherein the at least one spread parameter comprises a maximum number of subcarriers between pilot symbols, a location of a first pilot in frequency, a maximum number of symbols between pilots, a location of the first pilot in time, or a combination thereof.

15. The first wireless device of claim 12, wherein the instructions for receiving the information of the channel condition comprises instructions for receiving a sounding reference signal (SRS) message from the second wireless device.

16. The first wireless device of claim 15, wherein the instructions for receiving the information of the channel condition comprises instructions for determining at least one channel condition parameter according to the SRS message.

17. The first wireless device of claim 12, wherein the microframe pilot pattern is selected from a set of predefined microframe pilot pattern allocations.

18. The first wireless device of claim 12, wherein the programming further includes instructions for selecting the microframe pilot pattern to use for subsequent communications with the second wireless device in a subframe on the wireless channel according to feedback from at least two receivers.

19. The first wireless device of claim 12, wherein transmitting the indication of the microframe pilot pattern to the second wireless device comprises transmitting pilot parameters in a downlink control information (DCI) or a radio resource control (RRC) message.

20. The first wireless device of claim 12, wherein the programming further comprises instructions for signaling a change in the microframe pilot pattern through bit toggling.

21. The first wireless device of claim 12, wherein the microframe pilot is an adjusted microframe pilot pattern that is different than an original microframe pilot pattern used for a previous data and pilot signal transmission from the first wireless device to the second wireless device.

22. The first wireless device of claim 12, wherein the programming further includes instructions for receiving a capability parameter via radio resource control (RRC) signaling from the second wireless device prior to transmitting the indication of the microframe pilot pattern to the second wireless device, the capability parameter indicating whether the second wireless device supports adaptive pilots.

* * * * *